(12) United States Patent
Yoon et al.

(10) Patent No.: US 9,710,079 B2
(45) Date of Patent: Jul. 18, 2017

(54) MOBILE TERMINAL USING FLEXIBLE DISPLAY AND METHOD OF CONTROLLING THE MOBILE TERMINAL

(71) Applicant: LG ELECTRONICS INC., Seoul (KR)

(72) Inventors: Sunghye Yoon, Busan (KR); Sujin Kim, Busan (KR); Jumin Chi, Busan (KR); Jiyoung Park, Anseong (KR); Jaeho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 13/839,812

(22) Filed: Mar. 15, 2013

(65) Prior Publication Data

US 2013/0300686 A1 Nov. 14, 2013

(30) Foreign Application Priority Data

May 9, 2012 (KR) .......................... 10-2012-0049343

(51) Int. Cl.
*G06F 3/041* (2006.01)
*G06F 3/0487* (2013.01)
(Continued)

(52) U.S. Cl.
CPC .............. *G06F 3/041* (2013.01); *G06F 3/017* (2013.01); *G06F 3/03547* (2013.01);
(Continued)

(58) Field of Classification Search
CPC ...... G06F 3/041; G06F 3/017; G06F 3/03547; G06F 3/04817; G06F 3/0482; G06F 3/0487
See application file for complete search history.

(56) References Cited

U.S. PATENT DOCUMENTS

2003/0227441 A1* 12/2003 Hioki .................... G06F 3/0412
345/156
2004/0008191 A1* 1/2004 Poupyrev ................ G06F 3/011
345/184

(Continued)

FOREIGN PATENT DOCUMENTS

| CN | 101782804 | 7/2010 |
| CN | 102089737 | 6/2011 |

(Continued)

OTHER PUBLICATIONS

European Patent Office Application Serial No. 12007971.0, Search Report dated Aug. 1, 2013, 9 pages.

(Continued)

*Primary Examiner* — Kumar Patel
*Assistant Examiner* — Sejoon Ahn
(74) *Attorney, Agent, or Firm* — Lee, Hong, Degerman, Kang & Waimey PC

(57) ABSTRACT

A mobile terminal including a flexible display unit and a control method thereof are provided. The mobile terminal includes a flexible display unit bendable in response to force applied to the mobile terminal. The mobile terminal includes a sensing unit configured to sense bending of the flexible display unit and a controller configured to generate a control signal for performing a function associated with information output to the flexible display unit in response to the bending.

17 Claims, 25 Drawing Sheets

(51) Int. Cl.
*G06F 3/01* (2006.01)
*G06F 3/0482* (2013.01)
*G06F 3/0481* (2013.01)
*G06F 3/0354* (2013.01)

(52) U.S. Cl.
CPC .......... *G06F 3/0482* (2013.01); *G06F 3/0487* (2013.01); *G06F 3/04817* (2013.01)

(56) References Cited

U.S. PATENT DOCUMENTS

| | | | |
|---|---|---|---|
| 2008/0271078 A1* | 10/2008 | Gossweiler et al. ............. | 725/40 |
| 2009/0007001 A1* | 1/2009 | Morin ................... | G06F 3/0237 |
| | | | 715/773 |
| 2009/0219247 A1* | 9/2009 | Watanabe ............... | G06F 1/1615 |
| | | | 345/157 |
| 2010/0001967 A1* | 1/2010 | Yoo ............... | 345/173 |
| 2010/0011291 A1* | 1/2010 | Nurmi ........................... | 715/702 |
| 2010/0045705 A1* | 2/2010 | Vertegaal ............ | A47G 19/2227 |
| | | | 345/661 |
| 2010/0056223 A1* | 3/2010 | Choi et al. .................... | 455/566 |
| 2010/0120470 A1* | 5/2010 | Kim ...................... | G06F 1/1615 |
| | | | 455/566 |
| 2010/0141605 A1* | 6/2010 | Kang et al. ................... | 345/174 |
| 2010/0182265 A1* | 7/2010 | Kim ...................... | G06F 1/1616 |
| | | | 345/173 |
| 2011/0193771 A1* | 8/2011 | Chronqvist .................. | 345/156 |
| 2011/0291945 A1* | 12/2011 | Ewing, Jr. ............. | G06F 1/1686 |
| | | | 345/173 |
| 2011/0310048 A1* | 12/2011 | B.R .................... | G06F 3/04817 |
| | | | 345/173 |
| 2012/0112994 A1* | 5/2012 | Vertegaal ................ | G06F 3/017 |
| | | | 345/156 |
| 2012/0319960 A1* | 12/2012 | Kildal et al. .................. | 345/173 |
| 2013/0009882 A1* | 1/2013 | Salmela .................. | G06F 3/016 |
| | | | 345/173 |
| 2013/0076649 A1* | 3/2013 | Myers ................. | H04M 1/0268 |
| | | | 345/173 |
| 2013/0111377 A1* | 5/2013 | Newman et al. ............. | 715/764 |
| 2013/0145311 A1* | 6/2013 | Joo ..................... | G06F 3/04886 |
| | | | 715/788 |
| 2013/0215041 A1* | 8/2013 | Kim ........................ | G06F 3/041 |
| | | | 345/173 |
| 2013/0300686 A1* | 11/2013 | Yoon ....................... | G06F 3/041 |
| | | | 345/173 |
| 2014/0009419 A1* | 1/2014 | Kim ..................... | G06F 3/0412 |
| | | | 345/173 |
| 2014/0310636 A1* | 10/2014 | Arrasvuori ............... | G06F 3/01 |
| | | | 715/771 |

FOREIGN PATENT DOCUMENTS

| | | |
|---|---|---|
| EP | 2202624 | 6/2010 |
| EP | 2333761 | 6/2011 |
| EP | 2660678 | 11/2013 |
| JP | 2004046792 | 2/2004 |
| KR | 20100065418 | 6/2010 |

OTHER PUBLICATIONS

The State Intellectual Property Office of the People's Republic of China Application Serial No. 201310007941.3, Office Action dated Apr. 14, 2017, 21 pages.
European Patent Office Application Serial No. 12007971.0, Search Report dated Apr. 25, 2017, 6 pages.

* cited by examiner

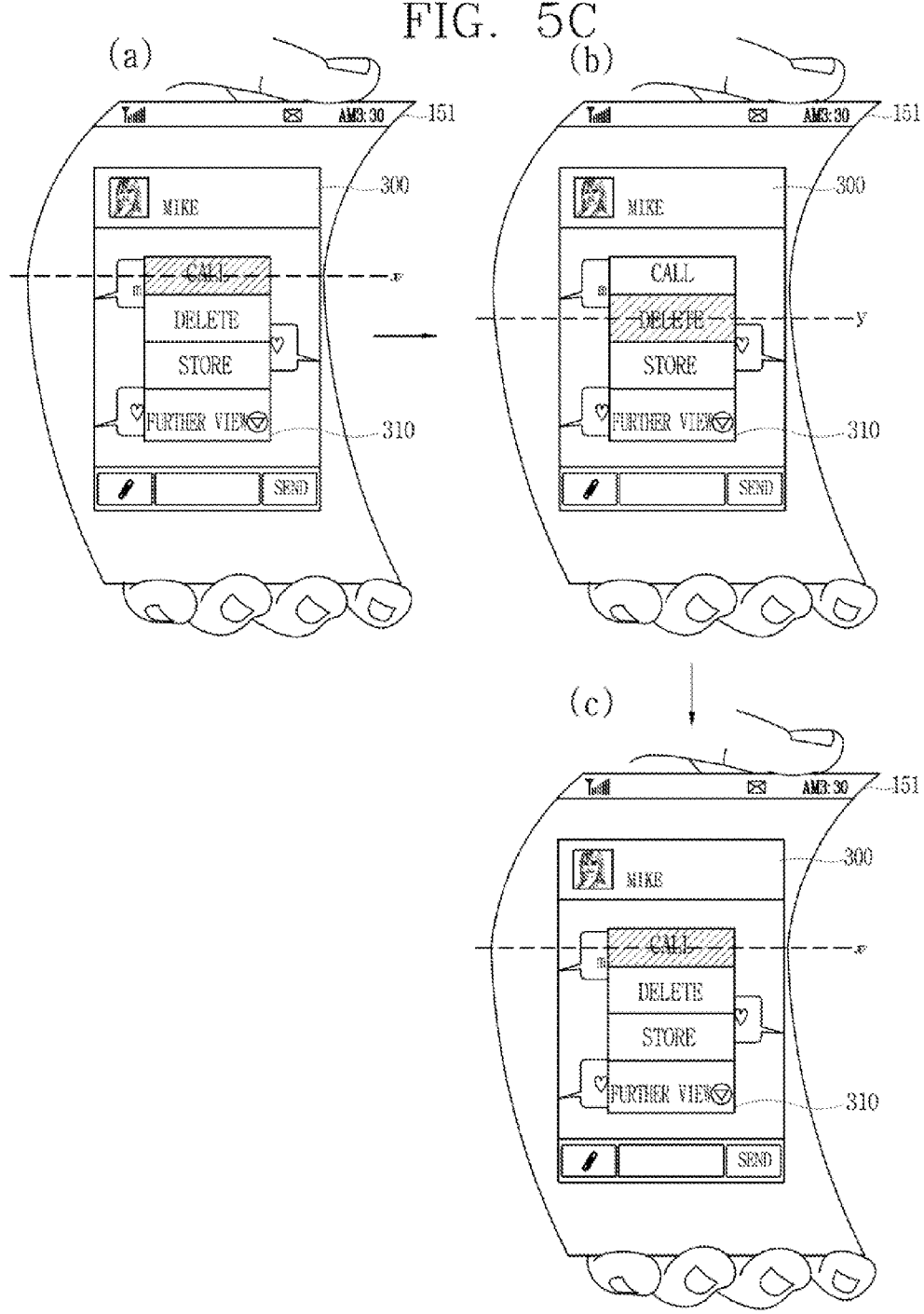

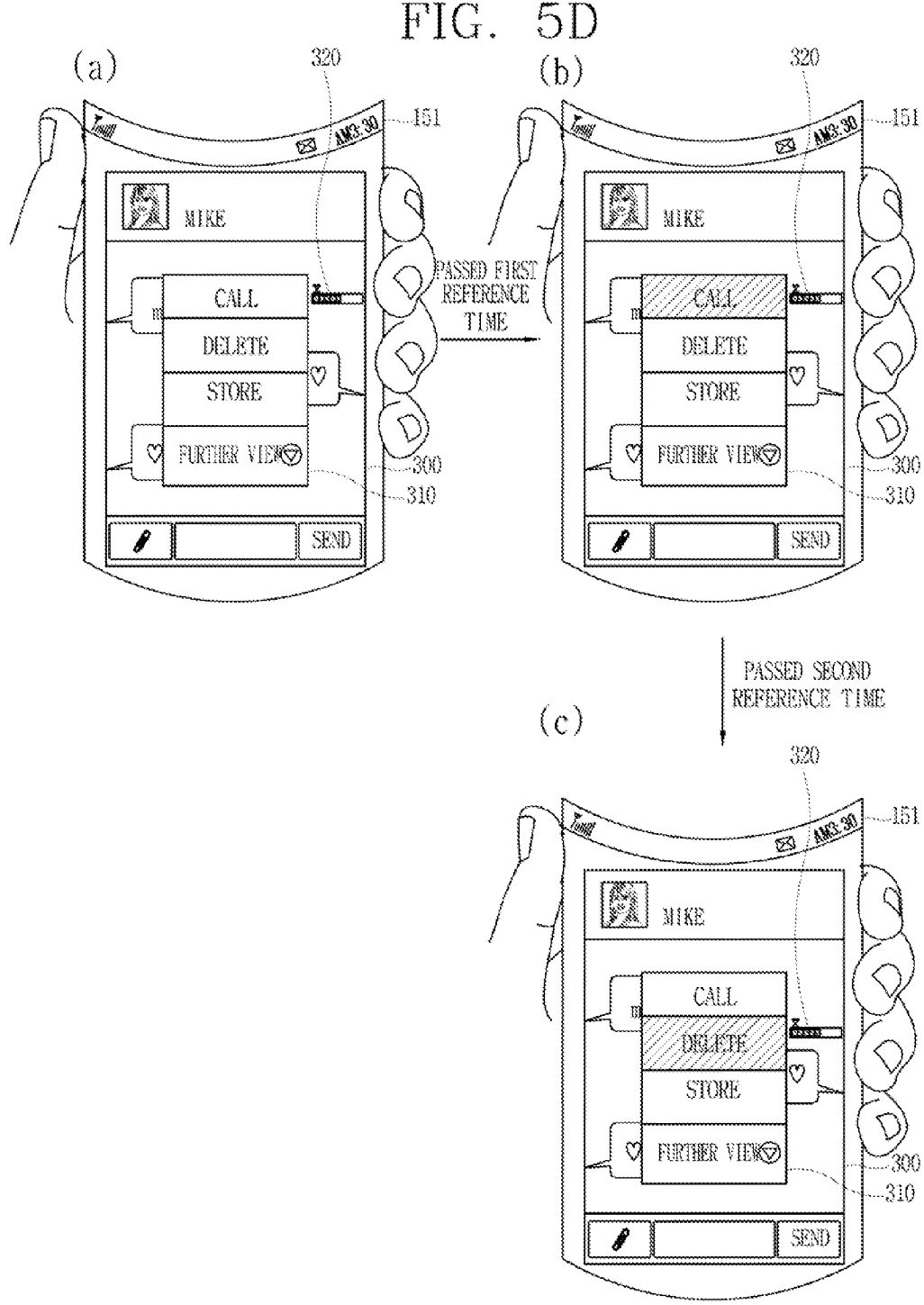

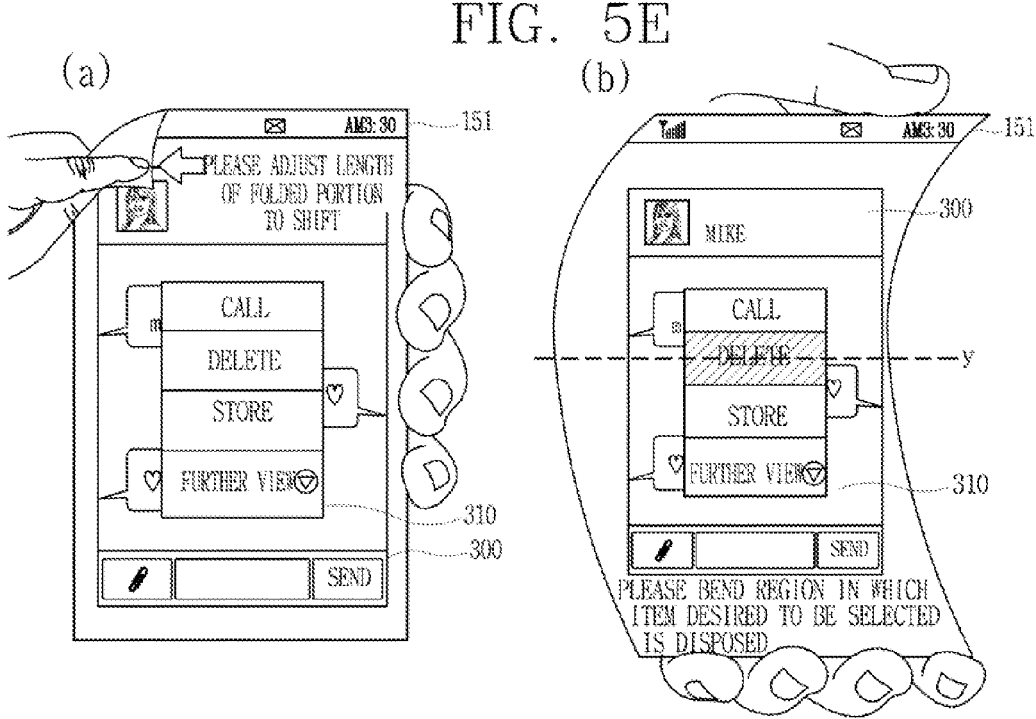

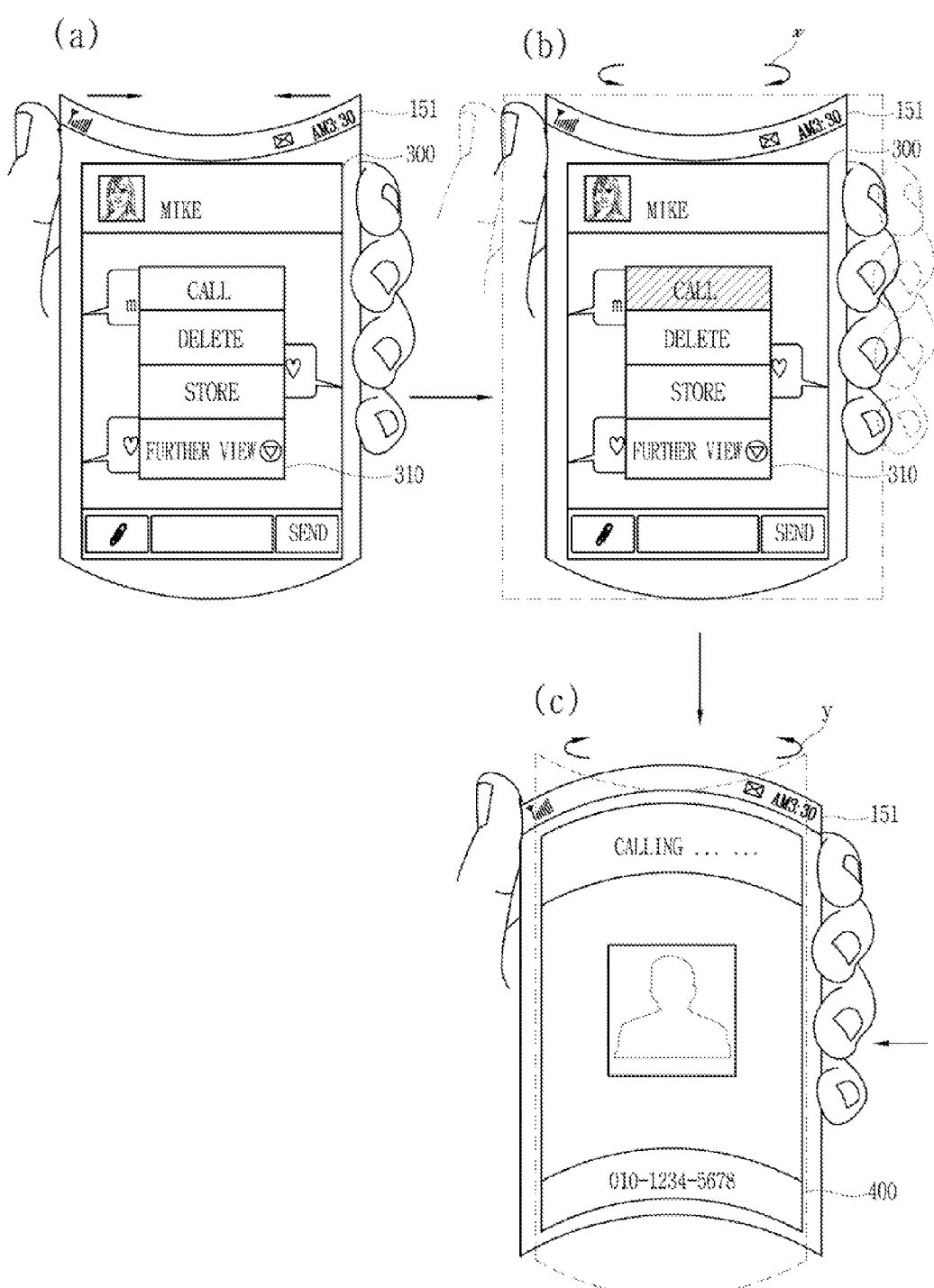

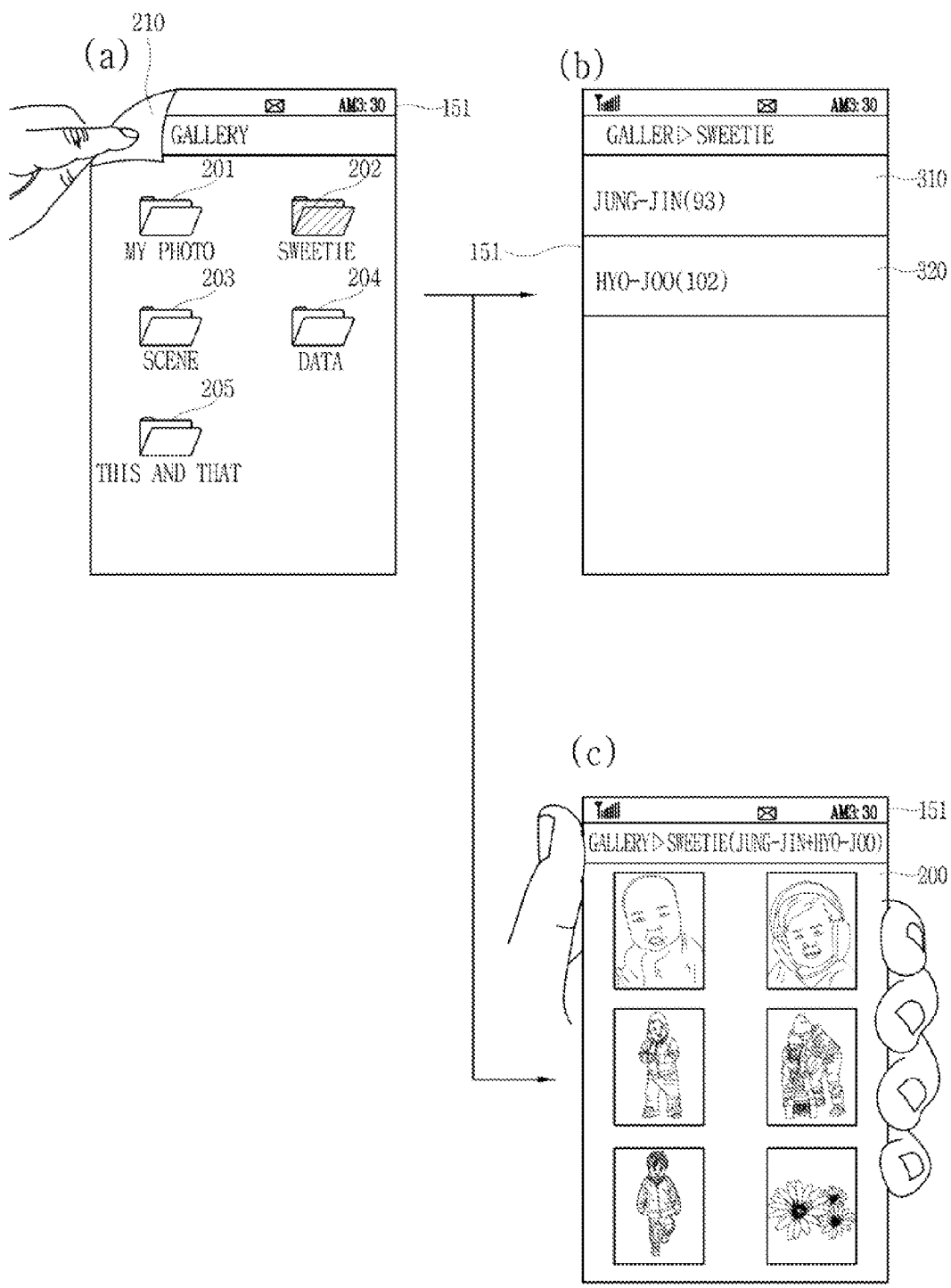

(a)

(b)

(d)

(c)

(a)

(b)

PAD REGION ACTIVATED (c)

MOBILE TERMINAL USING FLEXIBLE DISPLAY AND METHOD OF CONTROLLING THE MOBILE TERMINAL

CROSS REFERENCE TO RELATED APPLICATIONS

Pursuant to 35 U.S.C. §119(a), the present application claims the benefit of earlier filing date and right of priority to Korean Application No. 10-2012-0049343, filed on May 9, 2012, the entire contents of which are hereby incorporated by reference herein in their entirety.

FIELD OF THE INVENTION

The present invention relates generally to a mobile terminal including a flexible display and interface, and method of controlling same.

BACKGROUND OF THE INVENTION

In general, mobile terminals (also referred to herein as "terminals") may be divided into a mobile terminal and stationary terminal according to whether or not terminals are movable. In addition, mobile terminals may be divided into a handheld terminal and a vehicle mount terminal according to whether or not users can directly carry it around. Other such divisions or classifications of mobile terminals of the present invention may include additional elements currently known or hereinafter developed as would be understood by a person of skill in the art as considered relevant and/or within the scope of this invention.

As functions become more diversified, the mobile terminal can support more complicated functions such as capturing images or video, reproducing music or video files, playing games, and receiving broadcast signals. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components that form the mobile terminal.

In general, terminals are evolving toward having diverse designs, and a flexible display having characteristics such as being lightweight and not easily broken has come to prominence. A flexible display is feasible to create a novel user interface area, which is limited or impossible with an existing glass substrate-based display.

Also, as a flexible display has been developed, the necessity of a user-friendly user interface using flexible display characteristics has emerged.

SUMMARY OF THE INVENTION

Example embodiments of the present invention provide a mobile terminal capable of generating a control command by using the characteristics of a flexible display unit that is pliable and bendable, and a control method of the mobile terminal.

According to an example embodiment of the present invention, there is provided a mobile terminal including a flexible display unit bendable in response to force applied from the outside, a sensing unit configured to sense bending of the flexible display unit, and a controller configured to generate a control signal for performing a function associated with information output to the flexible display unit in response to the bending.

In an example embodiment of the present invention, the controller may control the flexible display unit to display at least one function icon corresponding to at least one function associated with information output to the flexible display unit based on the generated control signal.

In an example embodiment of the present invention, the at least one function icon may terminate an output to the flexible display unit based on restoration of the bent flexible display unit.

In an example embodiment of the present invention, the controller may control the flexible display unit to display the at least one function icon on a first region of the flexible display unit, which is differentiated from a second region sensed to be bent and third region sensed to be bent of the flexible display unit such that the at least one function icon is recognizable to a user.

In an example embodiment of the present invention, based on bending of the flexible display unit sensed after the at least one function icon is displayed, the controller may execute a function corresponding to any one of the at least one function icon.

In an example embodiment of the present invention, any one of the at least one function icon may be selected according to a degree of bending of the flexible display unit, and a function corresponding to the selected any one function icon may be executed.

In an example embodiment of the present invention, the controller may receive a selection signal of any one of the at least one function icon based on bending attribute information of the flexible display unit, and the bending attribute information may be information regarding at least one of the number of times of bending of the flexible display unit, a strength of bending, a position of bending, or a direction of bending.

In an example embodiment of the present invention, the controller may sense bending of one corner of the flexible display unit, distinctly display a function icon displayed on a position corresponding to the one corner among the at least one function icon, and execute a function corresponding to the distinctly displayed function icon.

In an example embodiment of the present invention, the controller may discriminately display a first function icon that is focused (selected) based on the bending attribute information among the at least one function icon such that it is discriminated from other function icons, and when the focus is moved to the second function icon based on a change in the bending attribute information, the display may display a second function icon such that it is discriminated from other function icons.

In an example embodiment of the present invention, the controller may execute different functions corresponding to the selecting of a function icon according to a strength of bending of the flexible display unit.

In an example embodiment of the present invention, in order to discriminate a screen image that has been displayed on the flexible display unit before the at least one function icon is displayed, from the at least one function icon, the controller may change display attribute information of the screen image or display the at least one function icon in a highlighting manner.

In an example embodiment of the present invention, the controller may map different functions associated with information output to the flexible display unit to at least one of a plurality of corners included in the flexible display unit, distinctly display a corner sensed to be bent among the plurality of corners, and execute a function mapped to the distinctly displayed corner.

In an example embodiment of the present invention, in response to bending of a first corner among a plurality of corners, the controller may output a plurality of function icons corresponding to a plurality of functions associated with information output to the flexible display unit, respectively, in response to bending of a second corner among the plurality of corners, the controller may change a focus on an icon among the plurality of function icons, and in response to simultaneous bending of first and second corners or in response to bending of the first corner more than one time (such as bending the first corner twice sequentially), the controller may execute a function corresponding to the focused (selected) icon among the plurality of function icons. In an example embodiment of the present invention, the controller may generate a control signal by using at least one pre-set corner among the plurality of corners, and control the flexible display unit to output guide information indicating the generation of the control signal to the at least one pre-set corner in response to the bending.

According to an example embodiment of the present invention, there is provided a mobile terminal including a flexible display unit bendable in response to force applied from the outside, a sensing unit configured to sense bending of the flexible display unit, and a controller configured to activate a first region corresponding to a first corner in response to bending of the first corner among a plurality of corners of the flexible display unit, and control information output to the flexible display unit according to a touch input by a touch object with respect to the first region based on the activation.

Based on the activation of the first region, the controller may output a touch pointer to the flexible display unit and move the touch pointer according to a movement of the touch object in the first region.

The controller may control the flexible display unit to display at least one function icon corresponding to at least one function associated with information output to the flexible display unit in response to first bending of the flexible display unit, and select any one of the at least one function icon in response to second bending different from the first bending of the flexible display unit.

When the second bending is continuously sensed, the controller may move between the at least one function icon in order to select a function icon different from the any one function icon.

When the second bending is not sensed in the flexible display unit when a pre-set time has lapsed, the controller may terminate displaying of the at least one function icon on the flexible display unit.

The first bending and the second bending may be different types of bending having different types of attribute information, and the attribute information may be information related to at least one of the number of times of bending, a strength of bending, a position of bending, and a direction of bending.

Further scope of applicability of the present invention will become apparent from the detailed description given hereinafter. However, it should be understood that the detailed description and specific examples, while indicating preferred example embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given with regard to the accompanying drawings, which are given for illustration only to provide further understanding of the invention and constitute a part of the application to illustrate example embodiments, and thus are not limitative of the present invention.

FIGS. 5A, 5B, 5C, 5D, and 5E are conceptual illustrations of a method for generating a control signal based on bending of the flexible display unit of the mobile terminal according to an example embodiment of the present invention.

FIGS. 6A, 6B, 6C and 6D are conceptual illustrations of a method for selecting a function by using bending of the flexible display unit in the mobile terminal according to an example embodiment of the present invention.

FIGS. 9A, 9B, 9C, 10A, and 10B are conceptual illustrations of a method for controlling information displayed on the terminal based on bending of the flexible display unit of the mobile terminal according to an example embodiment of the present invention.

DETAILED DESCRIPTION OF THE INVENTION

The example embodiments of the present invention will now be described with reference to the accompanying drawings, in which like reference numbers refer to like elements throughout the majority of figures although the example embodiments of the figures may, in some cases, differ. The accompanying drawings of the present invention aim to facilitate understanding of the present invention and the present invention should not be construed as limited to the accompanying drawings.

In the following description, usage of suffixes such as 'module,' 'part,' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art.

Example embodiments of mobile terminals (also referred to as "terminal(s)") described in the present disclosure may include mobile phones, smart phones, notebook computers, tablet computers, digital broadcast receivers, Personal Digital Assistants (PDAs), Portable Multimedia Players (PMPs), navigation devices, personal computers (PCs), tablet PCs, ultra-books, or the like. However, it would be understood by a person skilled in the art that the configuration according to example embodiments of the present invention may also be applicable to fixed types of terminals such as digital televisions (TVs) and desktop computers.

Figure 1:
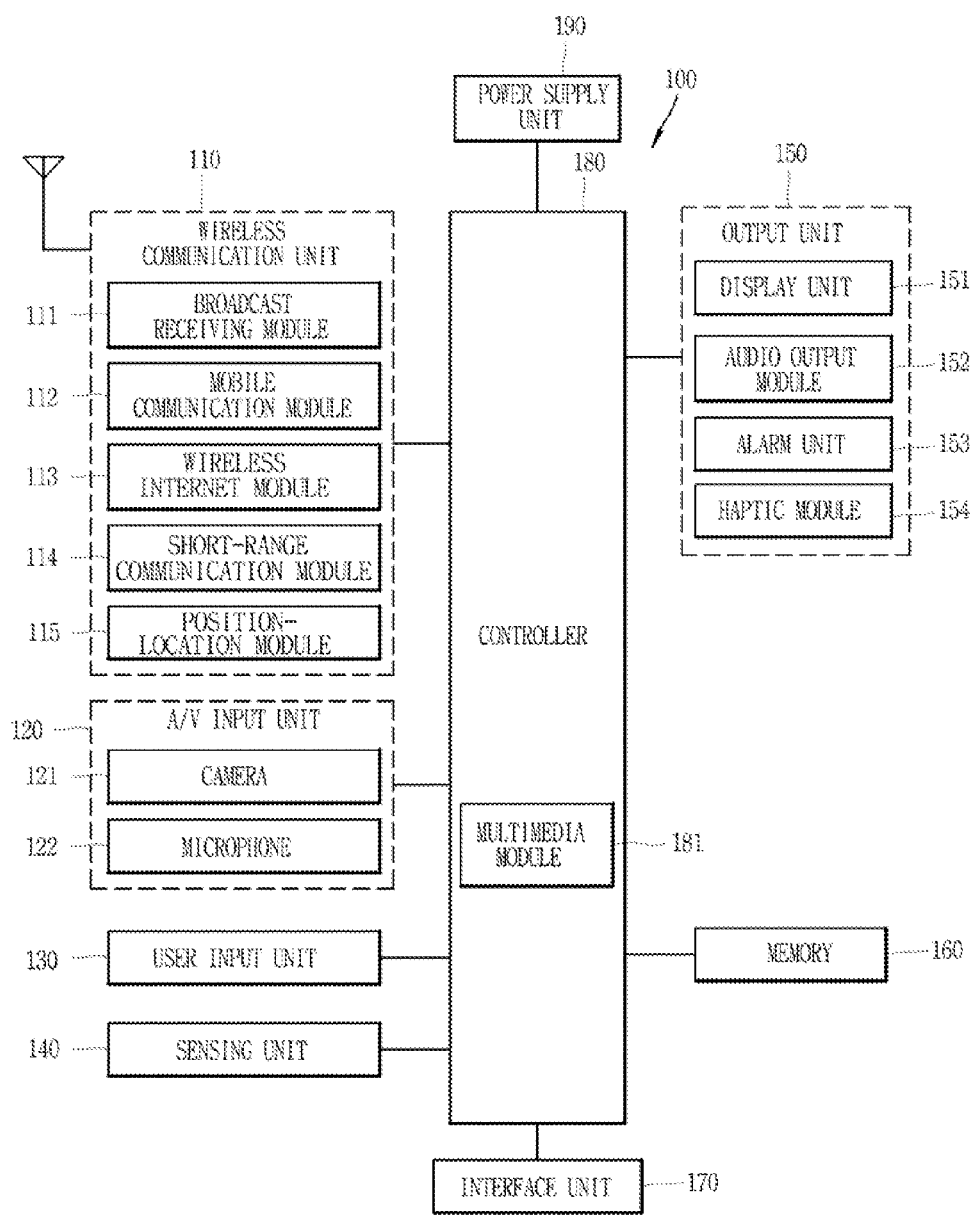
FIG. 1 is a block diagram of a mobile terminal according to an example embodiment of the present invention.

FIG. 1 is a block diagram of a mobile terminal according to an example embodiment of the present invention. The mobile terminal 100 may include a wireless communication unit 110, an Audio/Video (A/V) input unit 120, a user input unit 130, a sensing unit 140, an output unit 150, a memory 160, an interface unit 170, a controller 180, and a power supply unit 190. FIG. 1 illustrates the mobile terminal as having various components, but it should be understood that implementing all of the illustrated components is not a requirement. Greater or fewer components may alternatively be implemented.

The wireless communication unit 110 typically includes one or more modules allowing radio communication between the mobile terminal 100 and a wireless communication system or a network in which the mobile terminal is located. For example, the wireless communication unit may include at least a broadcast receiving module 111, a mobile communication module 112, a wireless Internet module 113, a short-range communication module 114, and a position location module also referred to at times as a location information module 115.

The broadcast receiving module 111 receives broadcast signals and/or broadcast associated information from an external broadcast management server (or other network entity) via a broadcast channel. Broadcast signals and/or broadcast-associated information received via the broadcast receiving module 111 may be stored in the memory 160.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, or a data broadcast signal. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and may be received by the mobile communication module 112.

The broadcast associated information may exist in various forms. For example, it may exist in the form of an electronic program guide (EPG) of digital multimedia broadcasting (DMB), or electronic service guide (ESG) of digital video broadcast-handheld (DVB-H).

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MEDIAFLO®), or integrated services digital broadcast-terrestrial (ISDB-T). The broadcast receiving module 111 may be configured to be suitable for every broadcast system that provides a broadcast signal as well as the above-mentioned digital broadcast systems.

The mobile communication module 112 transmits and/or receives radio signals to and/or from at least a base station, an external terminal, and/or a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a Wireless Local Area Network (WLAN), Wireless Fidelity (Wi-Fi), Wireless broadband (WiBro), Worldwide Interoperability for Microwave Access (Wimax), or High Speed Downlink Packet Access (HSDPA).

The short-range communication module 114 is a module for supporting short range communications. Some examples of short-range communication technology include BLUETOOTH®, Radio Frequency identification (RFID), Infrared Data Association (IrDA), Ultra-WideBand (UWB), and ZIGBEE®.

The location information module 115 is a module for checking or acquiring a location (or position) of the mobile terminal. A typical example of the location information module is a Global Positioning System (GPS).

With reference to FIG. 1, the audio/visual (A/V) input unit 120 is configured to receive an audio or video signal. The A/V input unit 120 may include a camera 121 and a microphone 122.

The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (e.g., audible data) via a microphone in a phone call mode, a recording mode, or a voice recognition mode and can process such sounds into audio data. The processed audio (e.g., voice) data may be converted for output into a format transmittable to a mobile communication base station via the mobile communication module 112 in the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, or a jog switch.

The sensing unit 140 detects a current status (or state) of the mobile terminal 100, such as an opened or closed state of the mobile terminal 100, a location of the mobile terminal 100, the presence or absence of user contact with the mobile terminal 100 (e.g., touch inputs), the orientation of the mobile terminal 100, or an acceleration or deceleration movement and direction of the mobile terminal 100 and generates commands or signals for controlling the operation of the mobile terminal 100.

For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, or vibration signal). The output unit 150 may include the display unit 151, an audio output module 152, an alarm unit 153, and a haptic module 154.

The display unit 151 may display (output) information processed in the mobile terminal 100. For example, when the mobile terminal 100 is in a phone call mode, the display unit 151 may display a User Interface (UI) or a Graphical User Interface (GUI) associated with a call or other communication (such as text messaging; or multimedia file downloading). When the mobile terminal 100 is in a video call mode or image capturing mode, the display unit 151 may display a captured image and/or received image, or a UI or GUI that shows videos or images and functions related thereto.

The display unit 151 may include at least a Liquid Crystal Display (LCD), a Thin Film Transistor-LCD (TFT-LCD), an Organic Light Emitting Diode (OLED) display, a flexible display, a three-dimensional (3D) display, or an e-ink display. The display unit 150 may be configured to be transparent or light-transmissive to allow viewing of the exterior, of the mobile terminal 100, which may be called transparent displays.

A typical transparent display may be, for example, a Transparent Organic Light Emitting Diode (TOLED) display. Through such configuration, the user can view an object positioned at the rear side of the terminal body through the region occupied by the display unit 151 of the terminal body.

The mobile terminal 100 may include two or more display units according to a particular desired example embodiment of the present invention. For example, a plurality of display units 151 may be separately or integrally disposed on one surface of the mobile terminal, or may be separately disposed on mutually different surfaces.

When the display unit 151 and a sensor (hereinafter also referred to as a 'touch sensor') for detecting a touch operation are overlaid in a layered manner to form a touch screen, the display unit 151 may function as both an input device and an output device. The touch sensor may have a form of a touch film, a touch sheet, a touch pad, or the like.

The touch sensor may be configured to convert pressure applied to a particular portion of the display unit 151 or a change in the capacitance generated at a particular portion of the display unit 151 into an electrical input signal. The touch sensor may be configured to detect the pressure when a touch is applied, as well as the touched position and area.

When there is a touch input with respect to the touch sensor, a corresponding signal(s) is transmitted to a touch controller. The touch controller processes the signal(s) and transmits corresponding data to the controller 180. Accordingly, the controller 180 may recognize which portion of the display unit 151 has been touched.

With reference to FIG. 1, a proximity sensor 141 may be disposed within, around, or near the touch screen. The proximity sensor 141 is a sensor configured to detect the presence or absence of an object relative to a certain detection surface or an object that exists nearby by using electromagnetic force or infrared rays without a physical contact. Thus, the proximity sensor 141 has a considerably longer life span compared with a contact type sensor and can be utilized for various purposes.

Examples of the proximity sensor 141 include a transmission type photoelectric sensor, a direct reflection type photoelectric sensor, a mirror-reflection type photoelectric sensor, an RF oscillation type proximity sensor, a capacitance type proximity sensor, a magnetic proximity sensor, and an infrared proximity sensor. When the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch,' while recognition of actual contacting of the pointer on the touch screen will be called a 'contact touch'. When the pointer is in the state of the proximity touch, it means that the pointer is positioned to correspond vertically to the touch screen. By controlling the proximity sensor 141, a proximity touch and a proximity touch pattern (e.g., a proximity touch distance, a proximity touch speed, a proximity touch time, a proximity touch position, or a proximity touch movement state) can be detected, and information corresponding to the detected proximity touch operation and the proximity touch pattern can be output to the touch screen.

The audio output module 152 may convert and output as sound audio data received from the wireless communication unit 110 or stored in the memory 160 in a call signal reception mode, a call mode, a record mode, a voice recognition mode, and a broadcast reception mode. The audio output module 152 may also provide audible outputs related to a particular function performed by the mobile terminal 100 (e.g., a call signal reception sound, or a message reception sound). The audio output module 152 may include a speaker, a buzzer, or other sound generating device.

The alarm unit 153 may provide outputs to indicate the occurrence of an event of the mobile terminal 100. Typical events include call reception, message reception, key signal inputs, and a touch input. In addition to audio or video outputs, the alarm unit 153 may provide outputs in a different manner to indicate the occurrence of an event.

For example, the alarm unit 153 may provide an output in the form of vibrations. When a call, a message, or some other incoming communication is received, the alarm unit 153 may provide tactile outputs (e.g., vibrations) to inform the user thereof. By providing such tactile outputs, the user can recognize the occurrence of various events even if his mobile phone is in the user's pocket.

Outputs indicate the occurrence of an event may also be provided via the display unit 151 or the audio output module 152. The display unit 151 and the audio output module 152 may be classified as a part of the alarm unit 153.

The haptic module 154 generates various tactile effects that the user may feel. A typical example of the tactile effects generated by the haptic module 154 is vibration. The strength and pattern of the vibration can be controlled. For example, different vibrations may be combined to be output or sequentially output. Two or more haptic modules 154 may be provided according to the configuration of the mobile terminal 100.

Besides vibration, the haptic module 154 may generate various other tactile effects, such as an effect by stimulation such as a pin arrangement vertically moving with respect to a contact skin, a spray force or suction force of air through a jet orifice or a suction opening, a contact on the skin, a contact of an electrode, electrostatic force, etc., or an effect by reproducing the sense of cold and warmth using an element that can absorb or generate heat. The haptic module 154 may be implemented to allow the user to feel a tactile effect through a muscle sensation such as fingers or arm of the user, as well as transferring the tactile effect through direct contact.

Example embodiments of the present invention include a memory, the memory 160 may store software programs used for the processing and controlling operations performed by the controller 180, or may temporarily store data (e.g., a phonebook, messages, still images, or video) that are input or output. In addition, the memory 160 may store data related to various patterns of vibrations and audio signals output when a touch is input to the touch screen.

The memory 160 may include at least one type of storage medium including a Flash memory, a hard disk, a multimedia card micro type, a card-type memory (e.g., secure digital (SD) or DX memory), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may also be operated in relation to a web storage device that performs the storage function of the memory 160 via the Internet.

Example embodiments of the present invention may include an interface unit 170 that may be configured to serve as an interface with external device(s) connected to the mobile terminal 100. For example, the interface unit 170 may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, or earphone ports.

The identification module may be a chip that stores various information for authenticating the authority of using the mobile terminal 100 and may include a user identity module (UIM), a subscriber identity module (SIM), or a universal subscriber identity module (USIM). In addition, the device having the identification module (hereinafter also referred to as 'identifying device') may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied there through to the mobile terminal 100 or may serve as a passage to allow various command signals inputted by the user from the cradle to be transferred to the mobile terminal there through. Various command signals or power inputted from the cradle may operate as signals for recognizing that the mobile terminal is properly mounted on the cradle.

The controller 180 may be configured to control the general operations of the mobile terminal. For example, the controller 180 performs controlling and processing associated with voice calls, data communications, and video calls. The controller 180 may include a multimedia module 181 for reproducing multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images. When a state of the mobile terminal satisfies pre-set conditions, the controller 180 may execute a locked state for limiting input of a control command from the user with respect to applications and may control a locked screen displayed in the locked state based on a touch input sensed via the display unit.

The power supply unit 190 receives external power or internal power and supplies appropriate power required for operating elements and components under the control of the controller 180.

Various example embodiments of the present invention described herein may be implemented in a computer-readable medium using, for example, software, hardware, or any combination thereof.

For hardware implementation, the example embodiments described herein may be implemented by using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In some cases, such example embodiments may be implemented by the controller 180 itself.

For software implementation, the example embodiments, such as procedures or functions described herein, may be implemented by separate software modules. Each software module may perform one or more functions or operations described herein. Software codes can be implemented by a software application written in any suitable programming language. The software codes may be stored in the memory 160 and executed by the controller 180.

Figure 2A:
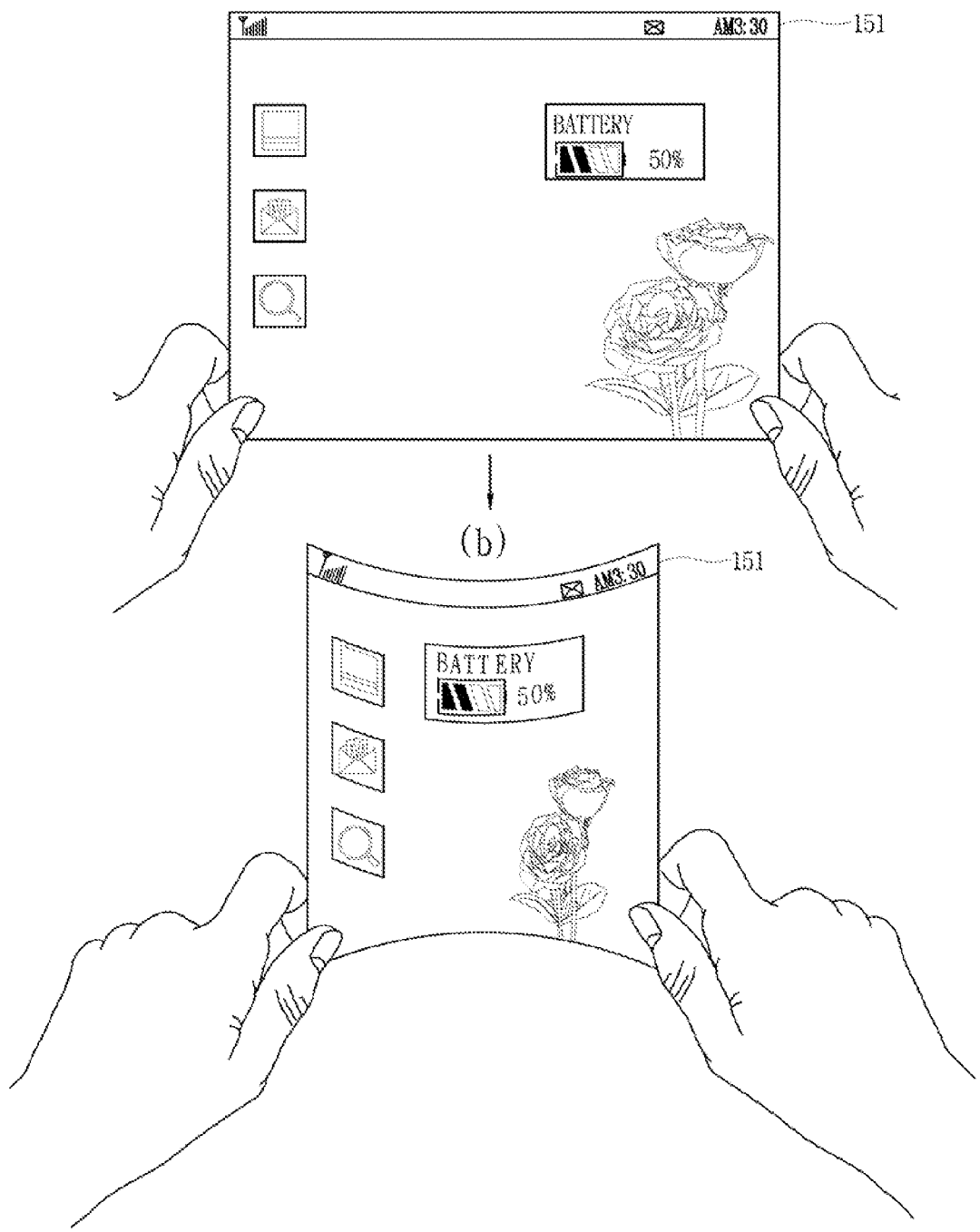
FIGS. 2A and 2B are conceptual illustrations of a flexible display unit included in the mobile terminal according to an example embodiment of the present invention.
Figure 2B:
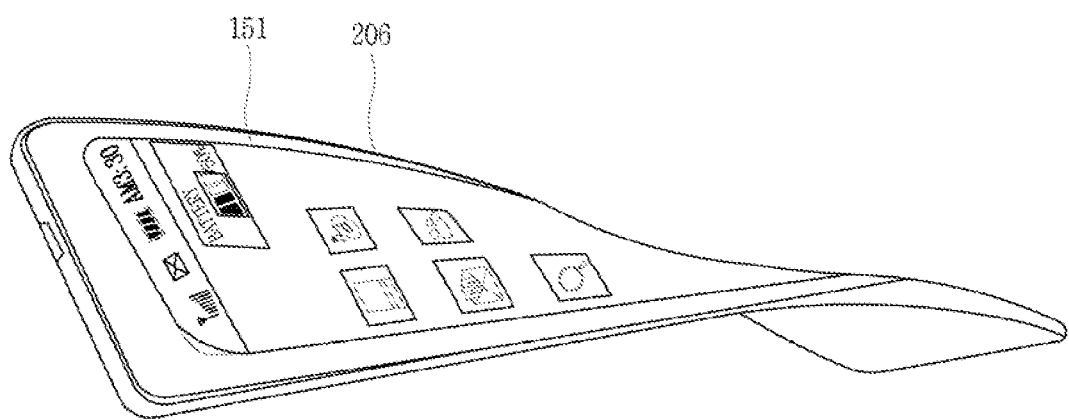

In an example embodiment of the present invention, information processed in the mobile terminal 100 may be displayed by using a flexible display unit. The flexible display unit will be described in detail with reference to the accompanying drawings. FIGS. 2A and 2B are conceptual views illustrating a flexible display unit included in the mobile terminal 100 according to an example embodiment of the present invention.

As illustrated in FIGS. 2A (a) and (b), the flexible display unit 151 includes a display that is bendable, foldable, and rollable in response to external force. The flexible display unit 151 may include both a general flexible display and electronic paper.

A general flexible display refers to a display which is light, unbreakable, and solid and fabricated on a thin, flexible substrate that is pliable, bendable, foldable, and rollable like paper, while maintaining display characteristics of a flat panel display. Electronic paper corresponds to a display technique employing characteristics of general ink, which is different from a general flat panel display in that electronic paper uses reflected light. Electronic paper may change figures or characters by using electrophoresis that utilizes twist balls or capsules.

A sensing unit 140 (see FIG. 1) is included in the flexible display unit 151 to sense bending information of the flexible display unit 151. In the present disclosure, the term 'bending' may include additional meanings such as being pliable, rollable, foldable, and contorted.

The sensing unit 140 may be located on the entirety or a portion of the flexible display unit 151, and sense bending information of the flexible display unit 151. The bending information may include information that may be sensed according to bending of the flexible display unit 151 such as a direction of bending, a degree of bending, a position of bending, a time of bending, and a return of the bent flexible display unit 151 to the original state.

The controller 180 may generate a control signal for changing information displayed on the flexible display unit 151 or a control signal for controlling a function of the terminal based on the bending information sensed by the sensing unit 140.

For example, as illustrated in FIGS. 2A (a) and (b), when the flexible display unit 151 is bent according to applied external force, the controller 180 may realign, separate, or synthesize a screen image displayed on the flexible display unit 151 or change information according to direction of bending and angle of bending of the flexible display unit 151 and return of the flexible display unit 151 returning to the original state.

For example, as illustrated in FIG. 2A (a) and (b), when the flexible display unit 151 is inwardly bent by external force, the display unit 151 may display screen images closer to each other. Conversely, when the flexible display unit 151 is outwardly bent by external force, the flexible display unit 151 may display the screen images farther apart from each other.

The controller 180 may also variably control a method for displaying information on the flexible display unit 151 such that a user may accurately recognize information displayed on the flexible display unit 151 in response to bending of the flexible display unit 151.

As shown in FIG. 2B, the mobile terminal 100 according to an example embodiment of the present invention including the flexible display unit 151 may include a case 206 surrounding the flexible display unit 151. The case 206 may be configured to be bent together with the flexible display unit 151 by an external force in consideration of the characteristics of the flexible display unit 151. As mentioned above, the controller 180 may generate a control signal related to a function of the mobile terminal according to an example embodiment of the present invention based on bending information of the flexible display unit 151.

Figure 3:
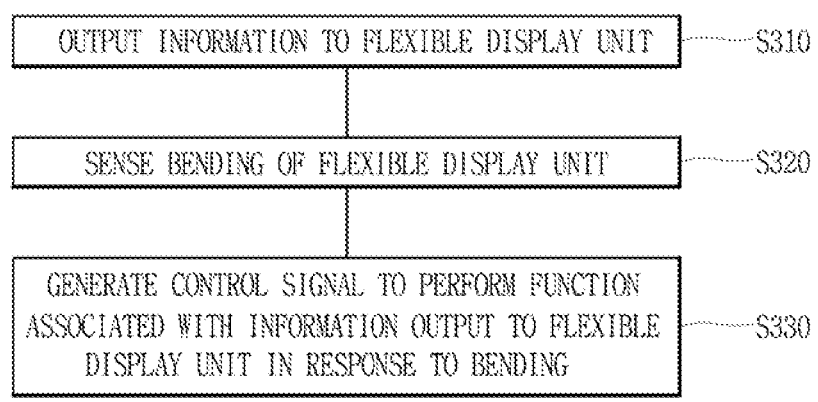
FIG. 3 is a flow chart that illustrates a control method for performing a function associated with information output to the flexible display unit of the mobile terminal according to an example embodiment of the present invention.

A method of generating a control signal for performing a function associated with information output to the flexible display unit 151 and based on sensed bending of the flexible display unit 151 among bending information of the flexible display unit 151 will be described in detail with reference to the accompanying drawings. FIG. 3 is a flow chart illustrating a control method for performing a function associated with information output to the flexible display unit of the mobile terminal 100 according to an example embodiment of the present invention. FIGS. 4A, 4B, 4C, and 4D are conceptual views illustrating the control method of FIG. 3.

The controller 180 (see FIG. 1) of the mobile terminal 100 according to an example embodiment of the present invention outputs information to the flexible display unit 151 (S310). In some example embodiments, the information output to the flexible display unit 151 may include at least one of text, an image (including an icon), and/or video. The information may be a home screen image or an execution screen of an application.

When information is displayed on the flexible display unit 151, the sensing unit 140 senses bending of the flexible display unit 151 (S321). In some example embodiments, the bending in response to external force applied to the flexible display unit 151. The external force may be applied by the user or an object other than the user.

For example, while the information is displayed on the flexible display unit 151, the controller 180 may control the sensing unit 140 to sense bending of the flexible display unit 151. In some such example embodiments, the controller 180 may control the sensing unit 140 to sense bending of the flexible display unit 151 anywhere regardless of a particular region (or a particular position). Further example embodiments of the controller 180 may control the sensing unit 140 to sense whether a pre-set particular region (or a particular position) of the flexible display unit 151 is bent or whether the flexible display unit 151 is bent in a particular direction.

When bending of the flexible display unit 151 is sensed, the controller 180 generates a control signal for performing a function associated with information output to the flexible display unit 151 (S330). The function associated with the information output to the flexible display unit 151 may be related to changing, switching, or controlling the information output to the flexible display unit 151. Therefore, in order to perform the function associated with the output information, the controller 180 may control the flexible display unit 151 to display at least one function icon (or item) corresponding to at least one function associated with the output information.

Figure 4A:
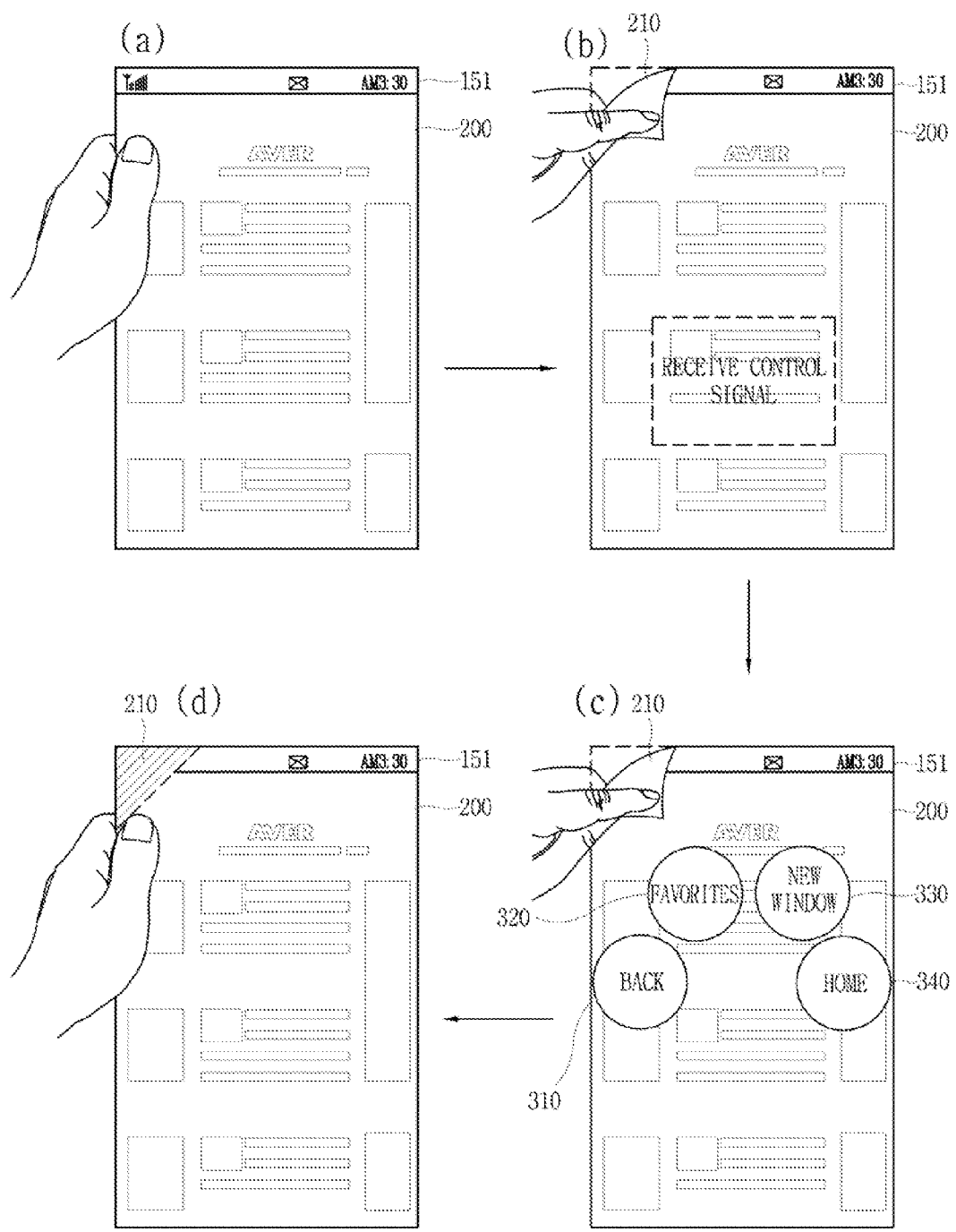
FIGS. 4A, 4B, 4C, and 4D are conceptual illustrations of the control method of FIG. 3 in the mobile terminal according to an example embodiment of the present invention.

For example, if information regarding a Web site is displayed on the flexible display unit 151, as illustrated in FIG. 4A(a), when one region 210 of the flexible display unit 151 is bent as illustrated in FIG. 4A(b), the controller 180 may receive a control signal related to the bending of the flexible display unit 151 from the sensing unit 140. As illustrated in FIG. 4A(c), the controller 180 may control the flexible display unit 151 to display at least one of function icons 310, 320, 330, or 340 corresponding to a function associated with output information in response to the bending of the flexible display unit 151. As illustrated in the example embodiment of the present invention in FIG. 4A(d), the controller 180 may control the flexible display unit 151 to terminate output of the at least one function icon 310, 320, 330, or 340 when the flexible display unit 151 is restored to its original state before the flexible display unit 151 was bent.

Also, as illustrated in FIG. 4A(b), the controller 180 may control the flexible display unit 151 to display at least one function icon 310, 320, 330, or 340 only when a pre-set particular region, e.g., a region 210 of the left corner, is bent. The position of the pre-set particular region may be variably changed to a certain position on the flexible display unit 151 according to a user selection.

Figure 4B:
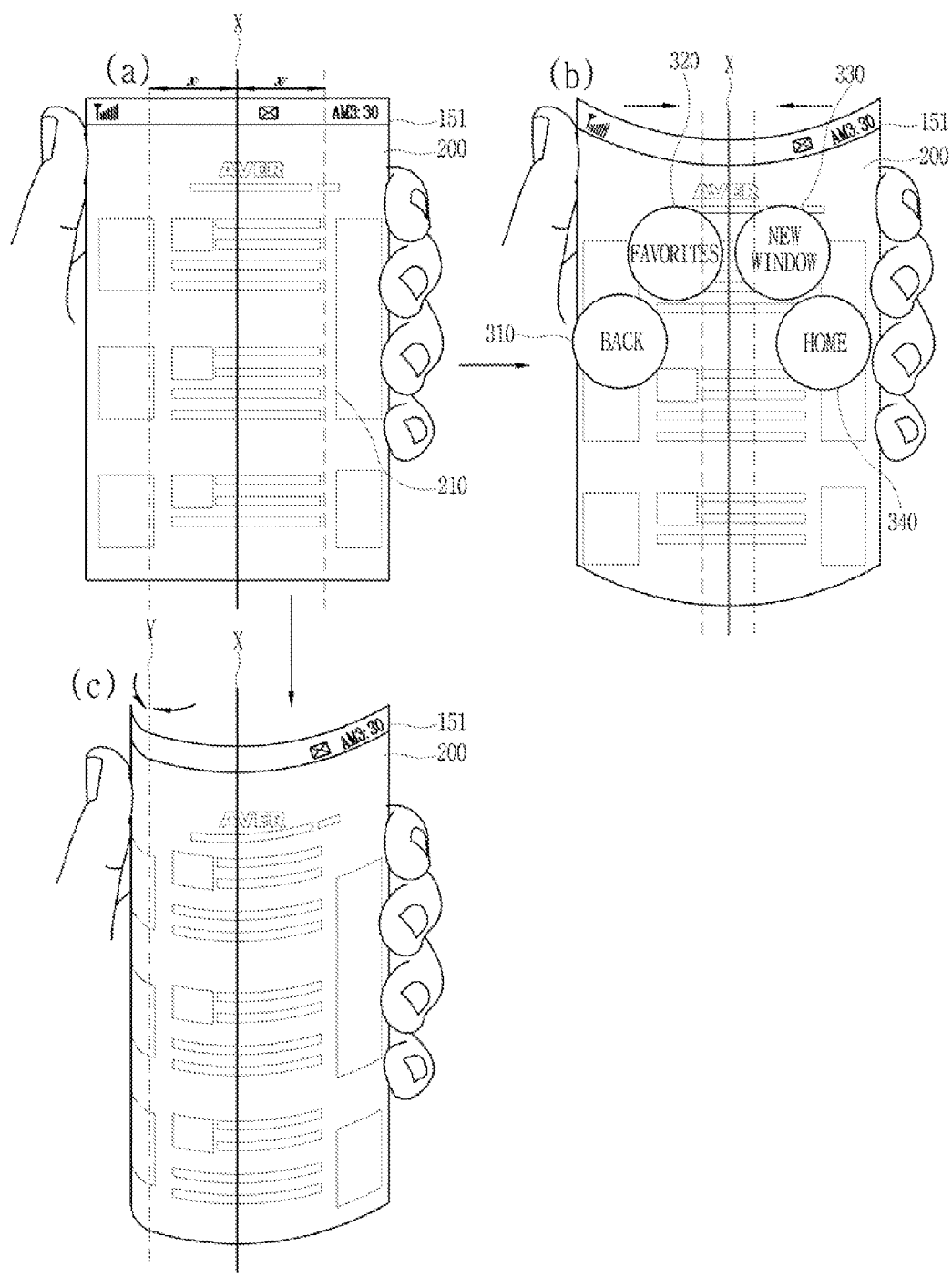

Also, as illustrated in FIGS. 4B(a) and (b), the controller 180 may control the flexible display unit 151 to display at least one function icon 310, 320, 330, or 340 when the flexible display unit 151 is bent within a certain range (x) with respect to a pre-set virtual reference axis (x).

Thus, only when the flexible display unit 151 is bent with respect to the reference axis X as illustrated in FIG. 4B(b), the at least one the function icon 310, 320, 330, or 340 is output to the flexible display unit 151 as illustrated in FIG. 4B(b). Here, the position of the pre-set virtual reference axis X may be variably changed according to a user selection. Additional example embodiments of the present invention may allow for a manual or real time virtual reference axis.

Also, when the flexible display unit 151 is bent with respect to a certain reference axis Y other than the pre-set virtual reference axis X as shown in FIG. 4B(c), the controller 180 may control the flexible display unit 151 to continue to output information, which has output to the flexible display unit 151 before the bending is sensed, without outputting the function icons 310, 320, 330, and 340.

In addition to the foregoing examples, the controller 180 may generate a control signal for performing a function associated with information output to the flexible display unit 151 based on the bending of the flexible display unit 151 in a pre-set direction. Based on bent regions of the flexible display unit 151 of the mobile terminal, according to an example embodiment of the present invention, the controller 180 may control the flexible display unit 151 to output different types of icons.

Figure 4C:
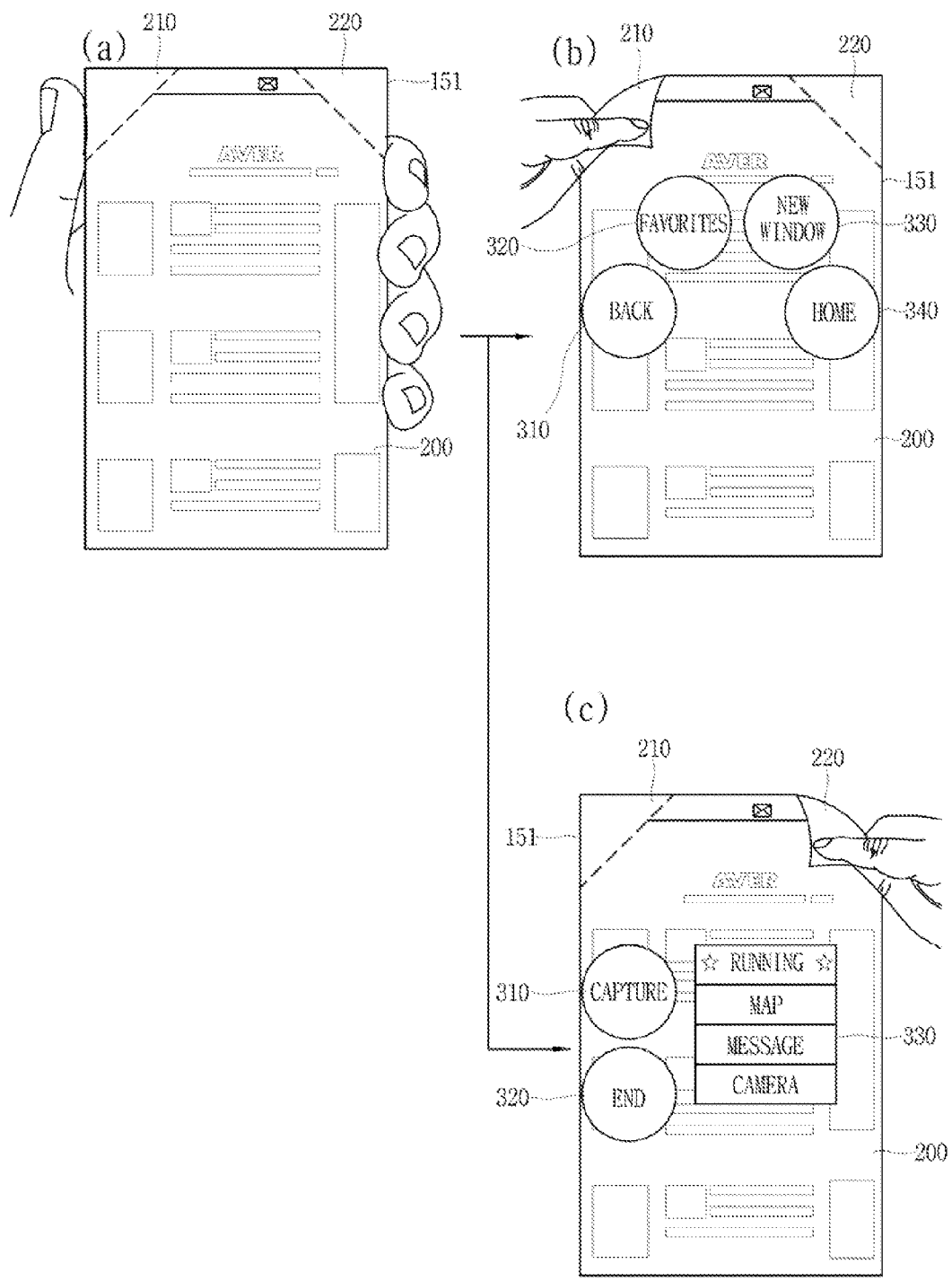

For example, as illustrated in FIGS. 4C(a) and (b), when a first region 210 of the flexible display unit 151 is bent, the controller 180 may output function icons 310, 320, 330, and 340 corresponding to functions associated with information output to the flexible display unit 151. As illustrated in FIGS. 4C(a) and (c), when the first region 210 and the second region 220 are bent, the controller 180 may output at least one function icon 310 that is related to general operations of the terminal or functions that can be commonly applicable in all applications installed in the terminal, without being limited to the information output to the flexible display unit 151 or to a particular application. The controller 180 may also output information 330 of at least one application being currently executed in the terminal. The functions that may be commonly applied to the generation operation of the terminal or to all applications installed in the terminal may include a function of capturing a screen image output to the display unit 151 or a function of terminating an application or terminal power.

In the mobile terminal 100 according to an example embodiment of the present invention, function icons corresponding to different types of functions are displayed based on bending of different regions of the flexible display unit. In this way, the user may control a general function related to the terminal without applying a touch input. When at least one function icon is output to the flexible display unit 151 based on bending of the flexible display unit 151, the user may apply a touch input to the output function icon or apply force to the flexible display unit 151 to allow or enable the bending of the flexible display unit 151 to be sensed and select any one of the function icons.

Figure 4D:
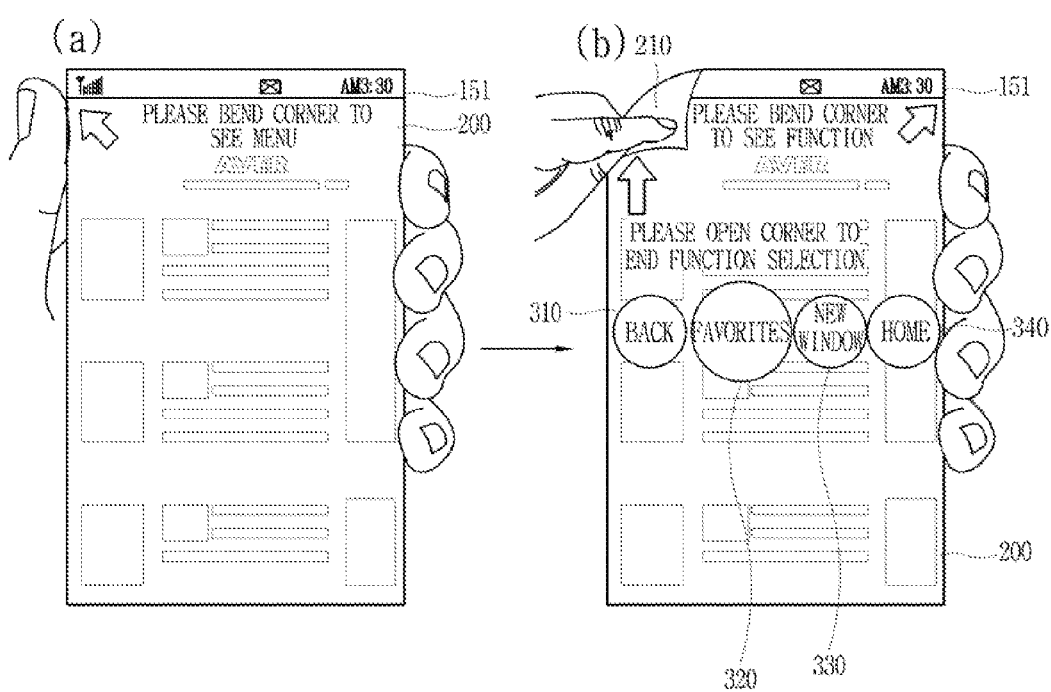

As illustrated in FIG. 4D(a) and (b), the controller may output information indicating generation of a control signal for performing a function associated with information output to the flexible display unit 151, such as outputting at least one function icon, based on the bending of the flexible display unit 151. As illustrated in FIG. 4D(a), the controller 180 may output guide information for bending the flexible display unit 151, such as, 'please fold corner to see menu'.

When the bending of the flexible display unit 151 should satisfy specific conditions, the controller 180 may display the particular conditions on the flexible display unit 151. The particular conditions may be related to at least a position, direction, duration, or speed of bending of the flexible display unit 151. Other example embodiments of the mobile terminal 100 may allow for a combination of such conditions or other conditions applicable to a display unit with flexible qualities.

As illustrated in FIG. 4D(b), the controller 180 may receive a selection signal at one function icon output based on bending of the flexible display unit 151, or output notification information for terminating the output of function icons to the flexible display unit 151. The guide information and notification information may be output in response to a touch input applied to the flexible display unit 151. Display of the output guide information and notification information may be terminated on the flexible display unit 151 based on the lapse of a pre-set time.

As described above, the mobile terminal 100 according to an example embodiment of the present invention may generate a control signal for performing a function associated with information output to the flexible display unit 151 in response to the bending of the flexible display unit 151. In this way, the user may not need to directly touch the flexible display unit 151.

Also, in the present example embodiment, a control signal may be generated for performing a function associated with information output to the flexible display unit 151 in response to bending of a pre-set region. In this way, a generation of a control signal for performing a function associated with the output information can be prevented when not intended by the user.

Hereinafter, a method of selecting function icons output to the flexible display unit 151 based on generation of a control signal for performing a function associated with information output to the flexible display unit will be described in detail with reference to the accompanying drawings. FIGS. 5A, 5B, 5C, 5D, and 5E are conceptual views illustrating a method for generating a control signal in response to bending of the flexible display unit in the mobile terminal 100 according to an example embodiment of the present invention.

The example embodiment in which at least one function icon is output according to generation of a control signal for performing a function associated with information output to the flexible display unit in response to the bending of the flexible display unit 151 has been described. When at least one function icon is output to the flexible display unit 151, the controller 180 may receive a control signal for moving a focus of at least one function icon to select any one of the at least one function icon.

In the description of FIGS. 5A, 5B, 5C, 5D, and 5E, 'selecting of a function icon' may be different from 'executing a function corresponding to a function icon'. For example, 'selecting a function icon' corresponds to a previous stage before executing a function corresponding to the selected function icon. Where the function icon corresponding to a function desired to be executed is first selected. In example embodiments disclosed herein, the expression 'selecting any one of at least one function icon' may be considered to mean 'moving focusing on at least one function icon' and another.

Figure 5A:
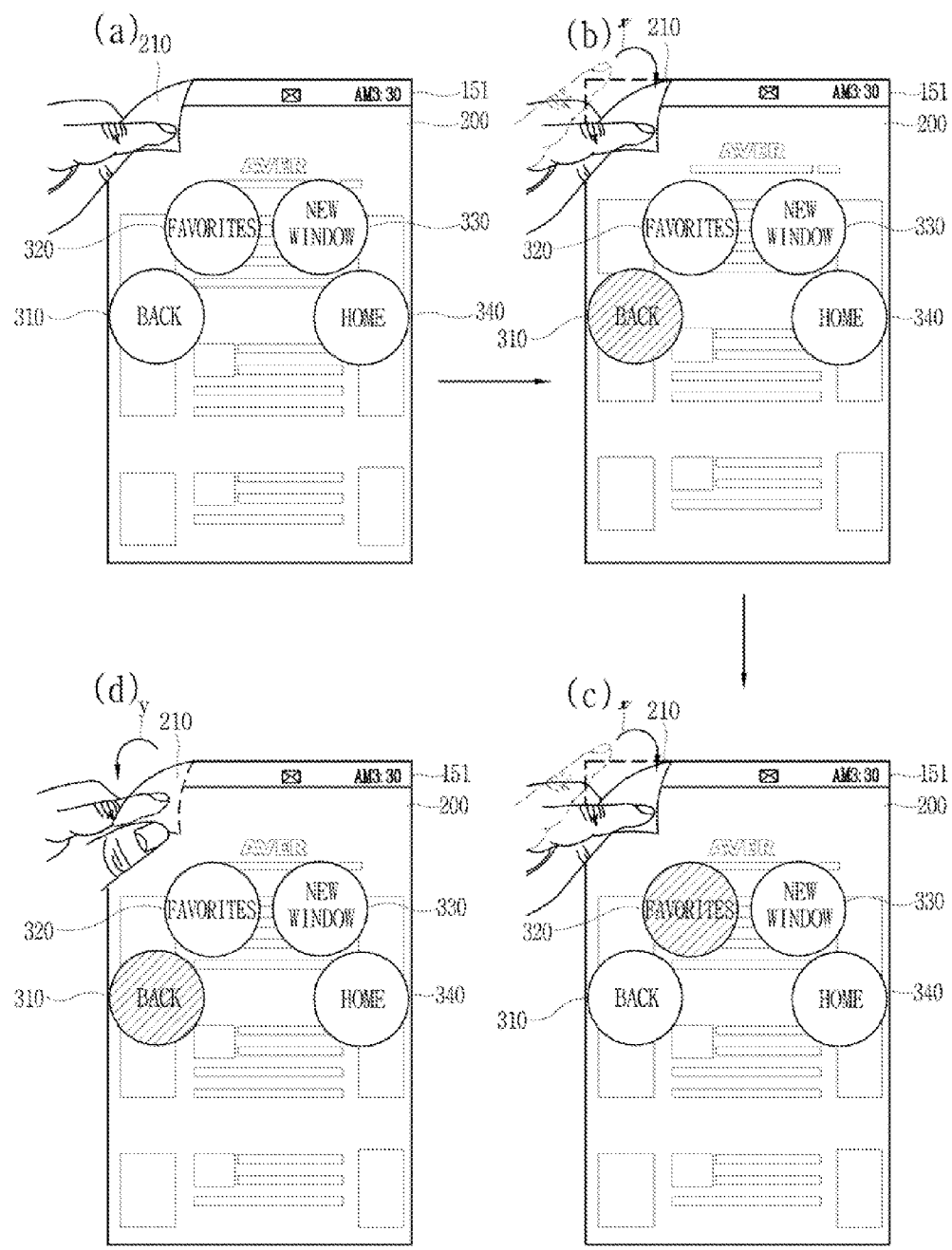

For example, if a plurality of function icons 310, 320, 330, and 340 are output in response to bending of the flexible display unit 151, as illustrated in FIG. 5A(a), when a region 210 of the flexible display unit 151 is bent, the controller 180 may generate a control signal for setting any one of the plurality of function icons 310, 320, 330, and 340 as a selected (focused) one. The region 210 may be a pre-set specific region.

Based on the bent region 210 the controller 180 may receive a selection signal at a first function icon 310 corresponding to a 'BACK' function among the plurality of function icons 310, 320, 330, and 340 as shown in FIG. 5A(b). As shown in FIG. 5A(c), when the region 210 is bent again, a second function icon 320 corresponding to a 'favorites' menu instead of the 'BACK' function may be selected.

As shown in FIG. 5A(d), when the region 210 of the flexible display unit 151 is bent in an 'x' direction different from a "y" direction described above with reference to FIGS. 5A(b) and 5A(c), the controller 180 may receive a selection signal at the first function icon 310 displayed before the second function icon 320 rather than selecting the third function icon 330 displayed next to the second function icon 320.

The controller 180 may also control any one function icon among the plurality of function icons to be selected based on a number of times the flexible display unit 151 is bent. For example, when the flexible display unit 151 is bent one time, the function icon displayed subsequently to the currently selected function icon is selected. When the flexible display unit 151 is bent two times, the controller 180 may control the display unit 151 to select a function icon displayed prior to the currently selected function icon.

Although not shown, the controller 180 may control any one of the plurality of function icons to be selected based on bending of different regions. For example, when a first corner among a plurality of corners of the flexible display unit 151 is bent, the controller 180 may select a function icon displayed subsequently from the currently selected function icon. When a second corner different from the first corner is bent, the controller 180 may select a function icon displayed prior to the currently selected function icon.

A control signal generated to select any one of the plurality of function icons in response to bending of the flexible display unit 151 may correspond to an order of the plurality of function icons 310, 320, 330, and 340 displayed on the flexible display unit 151. In order to provide information regarding a currently selected function icon to the user, the controller 180 may display the currently selected function icon such that it is discriminated from other function icons as illustrated in FIGS. 5A(b), 5A(c), and 5A(d).

In some example embodiments, the method of displaying the function icon discriminated from the other function icons may be variably displayed by upsizing or downsizing the function icons, changing the color of the function icons, blinking, or changing transparency. The items to be displayed discriminately from a particular function icon from other function icons may be expressed as 'highlighting'.

Figure 5B:
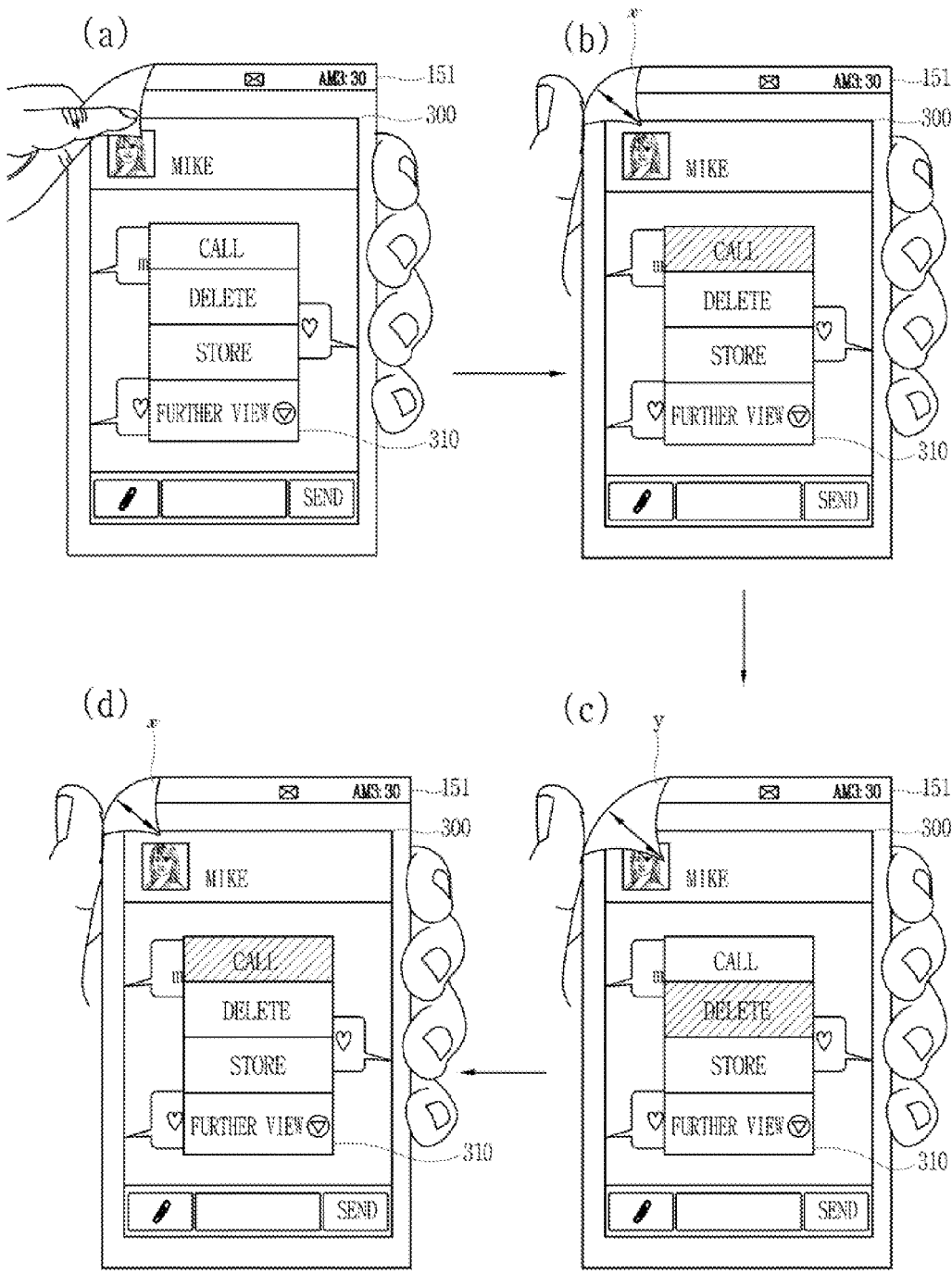

Another example of receiving a control signal for selecting any one of a plurality of function icons in response to bending the flexible display unit 151 will be described. As illustrated in FIG. 5B(a)-(d), the controller may generate a control signal in response to any one of the plurality of function icons based on a length (or area) of a folded region of the flexible display unit 151. The controller 180 may map function icons (or items) selected for every folded length (or area) of the flexible display unit 151 with mapping method based on an order of displaying a plurality of function icons.

For example, as shown in FIG. 5B(b), when one region of the flexible display unit 151 is bent by a length 'x,' the controller 180 may select an item 'call' among a plurality of items 311. As illustrated in FIG. 5B(c), when a region of the flexible display unit 151 is folded by a length 'y' longer than a length 'x,' the controller 180 may select a 'delete' item disposed next the 'call' item. And as illustrated in FIG. 5B(c), when one region of the flexible display unit 151 is folded by the 'x' length, the controller 180 may re-select the 'call' item. Although not shown, if the 'call' item is selected, when the flexible display unit 151 is folded such that it corresponds to a length 'z' longer than the length 'y', the controller 180 may not select the item 'delete' but instead select an item 'store'.

An example of receiving a control signal for selecting any one of a plurality of function icons in response to bending of the flexible display unit 151 will be described. As shown in FIG. 5C, the controller 180 may select any one of a plurality of function icons (or items) based on a bent position of the flexible display unit 151. For instance, the controller 180 may select a function icon displayed in a region corresponding to the region of the flexible display unit 151 that is sensed as being bent.

For example, as shown in FIG. 5C(a), if a plurality of items 311 are displayed, when the flexible display unit 151 is bent with respect to a first reference axis (x), the controller 180 may select the item 'call'. As shown in FIG. 5C(b), when the flexible display unit 151 is bent with respect to a second reference axis (y), the controller 180 may select the item 'delete'. Also, as illustrated in FIG. 5C(c), when the flexible display unit 151 is bent again based on the first reference axis (x), the controller may select the item "delete" again.

Also, another example of receiving a control signal for selecting any one of a plurality of function icons in response to bending of the flexible display unit 151 will be described. As shown in FIG. 5D, the controller 180 may select any one of a plurality of function icons based on a duration for which the bending of the flexible display unit 151 is maintained.

As illustrated in FIG. 5D(a), when the duration for which the bending of the flexible display unit 151 is maintained exceeds a first reference time, the controller 180 may select the item 'call' as shown in FIG. 5D(b). In the state in which the item 'call' is selected, when the duration for which the bending of the flexible display unit 151 exceeds a second reference time, the controller 180 may select the item 'delete' as illustrated in FIG. 5D(c). In this manner, the controller may generate a control signal such that the plurality of items are sequentially selected according to a duration for which the bending of the flexible display unit 151 is maintained. Also, based on the bent flexible display unit 151, the controller 180 may inform the user of the bending duration by using visual information 321 or voice information.

In order to allow any one of a plurality of function icons to be selected, the controller 180 may display guide information for bending the flexible display unit 151. The guide information may be indicated by using an arrow indicating an image (e.g., icon) or bending direction. The controller 180 may output information related to bending of the flexible display unit 151 to select any one of the function icons (e.g., items) to the flexible display unit 151.

For example, when any one of the plurality of function icons (or items) is selected based on a length of bending of the flexible display unit 151, as described above with reference to FIG. 5B, the controller 180 may induce the length of bending of the flexible display unit 151 to be adjusted by using text or an image. Also, when a plurality of function icons (or items) are selected according to a position of bending of the flexible display unit 151, as described above with reference to FIG. 5C, the controller 180 may output guide information such as 'please bend a region in which an item desired to be selected is disposed' as shown in FIG. 5E(b).

In addition to the method illustrated in FIG. 5E, the mobile terminal 100 according to an example embodiment of the present invention may output information for facilitating selection of a plurality of function icons (or items) according to various methods by using visual information such as text, an image, or voice information.

Figure 6A:
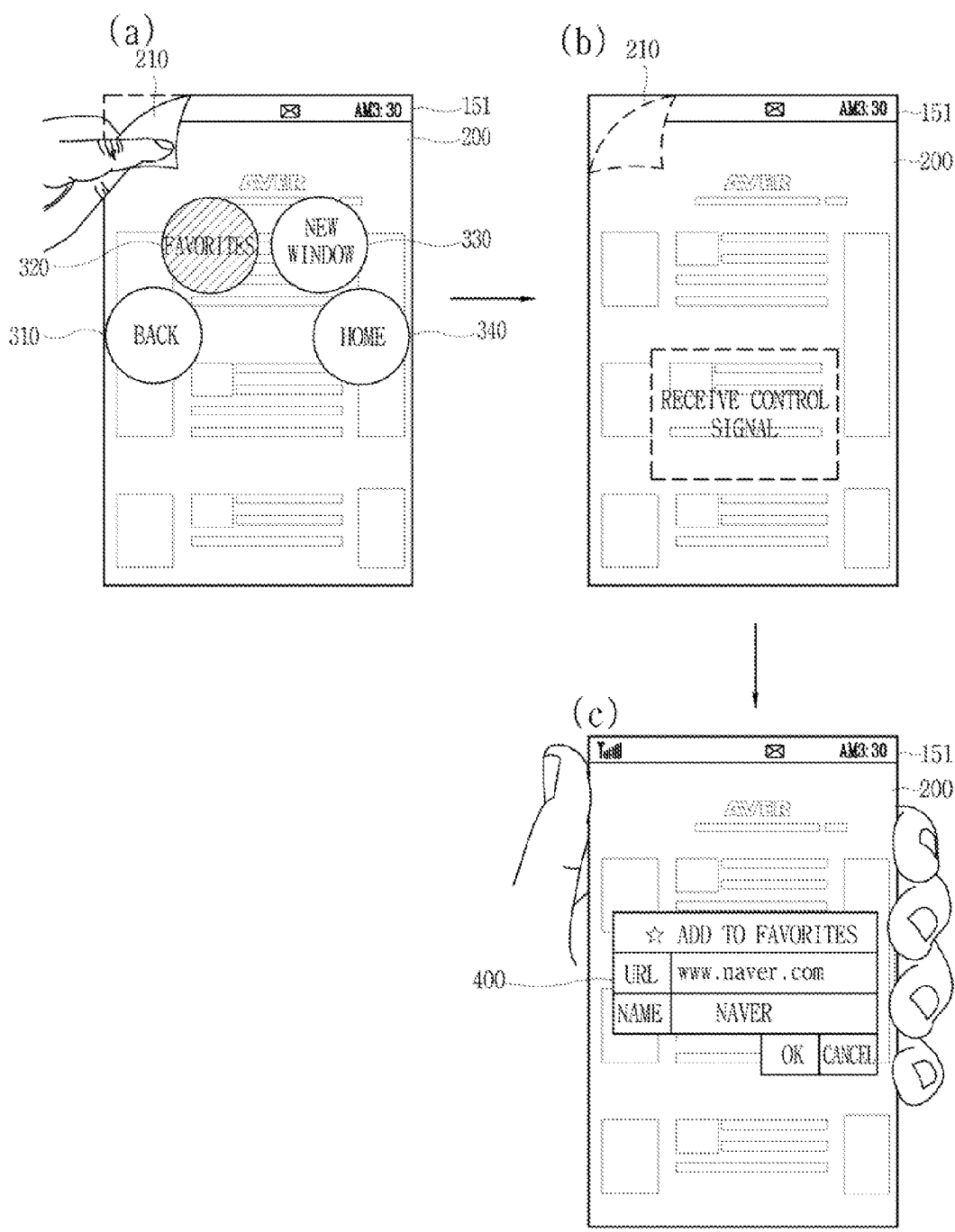
Figure 6B:
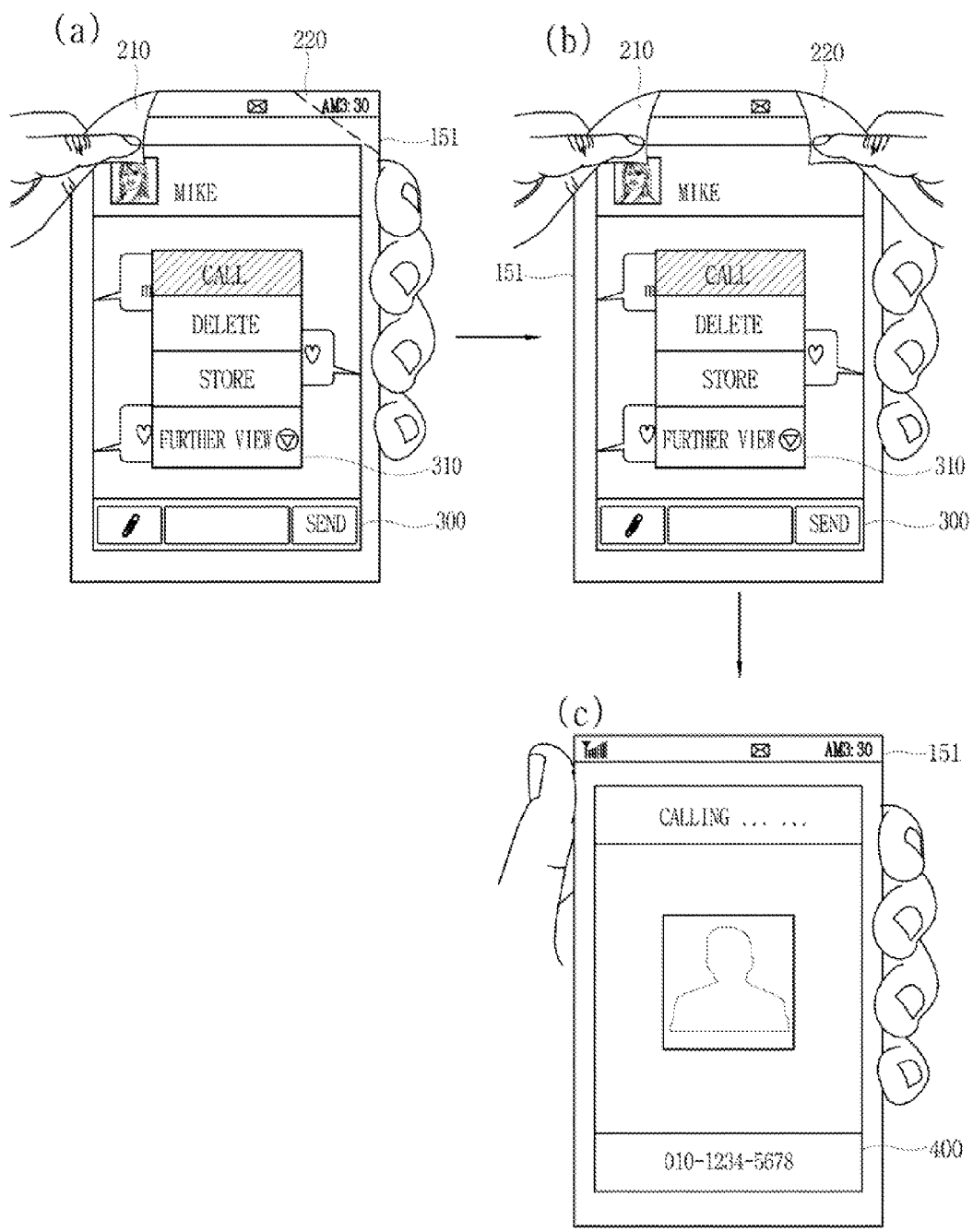

Hereinafter, a method of executing a function corresponding to a selected function icon when any one function icon (or item) is selected as described above with reference to FIGS. 5A, 5B, 5C, 5D, and 5E will be described in detail with reference to the accompanying drawings. FIGS. 6A, 6B, and 6C are conceptual views illustrating a method for selecting a function by using bending of the flexible display unit in the mobile terminal 100 according to an example embodiment of the present invention.

Based on bending attribute information of the flexible display unit 151, the controller 180 may select any one of the plurality of function icons (or items). The bending attribute information may be information related to at least a number of times of bending, a strength of bending, a position of bending, a direction of bending, or a duration of bending.

For example, as illustrated in FIG. 6A(a), when a function icon 320 is selected based on bending of the flexible display unit 151, the controller 180 may execute a function corresponding to the function icon 320 in response to restoration of the flexible display unit 151 to the original state. As illustrated in FIG. 6(A)(b), when the folded region 210 is unfolded to the original state, the controller 180 executes a function corresponding to the selected function icon 320. Thus, as illustrated in FIG. 6A(c), a function corresponding to the 'favorites' function icon 320 is executed, and an execution screen 400 for favorites function may be output to the flexible display unit 151.

Although not shown, even if the flexible display unit 151 is not restored to the original state, the controller 180 may execute a function corresponding to the function icon 320 based on bending of one region of the flexible display unit 151 by more than a pre-set number of times. For example, when a region of the flexible display unit 151 is bent (or curved) twice continuously, the controller 180 executes a function corresponding to the function icon 320.

In another example, as illustrated in FIG. 6B(a) and (b), based on bending of a plurality of regions, the controller 180 may execute a function corresponding to any one function icon (or item). After a 'call' function is selected by bending of a corner corresponding to the first region 210 as shown in FIG. 6B(a), when a corner corresponding to the first region 210 and a corner corresponding to the second region 220 are simultaneously bent, the controller 180 may execute the 'call' function as illustrated in FIG. 6B(c).

A region for selecting a function and at least one region for executing a function may be previously set. The controller 180 may output guide information regarding the region by using at least visual information such as text, image, or voice information to allow the user to recognize the pre-set region.

In another example, as shown in FIG. 6C(a) and (b), any one of a plurality of function items may be selected by bending of the flexible display unit 151 in an 'x' direction. As illustrated in FIG. 6C(c), when a function item is selected, and the flexible display unit 151 is bent in a 'y' direction different from the 'x' direction, the controller 180 may execute a function corresponding to the function item.

Figure 6D:
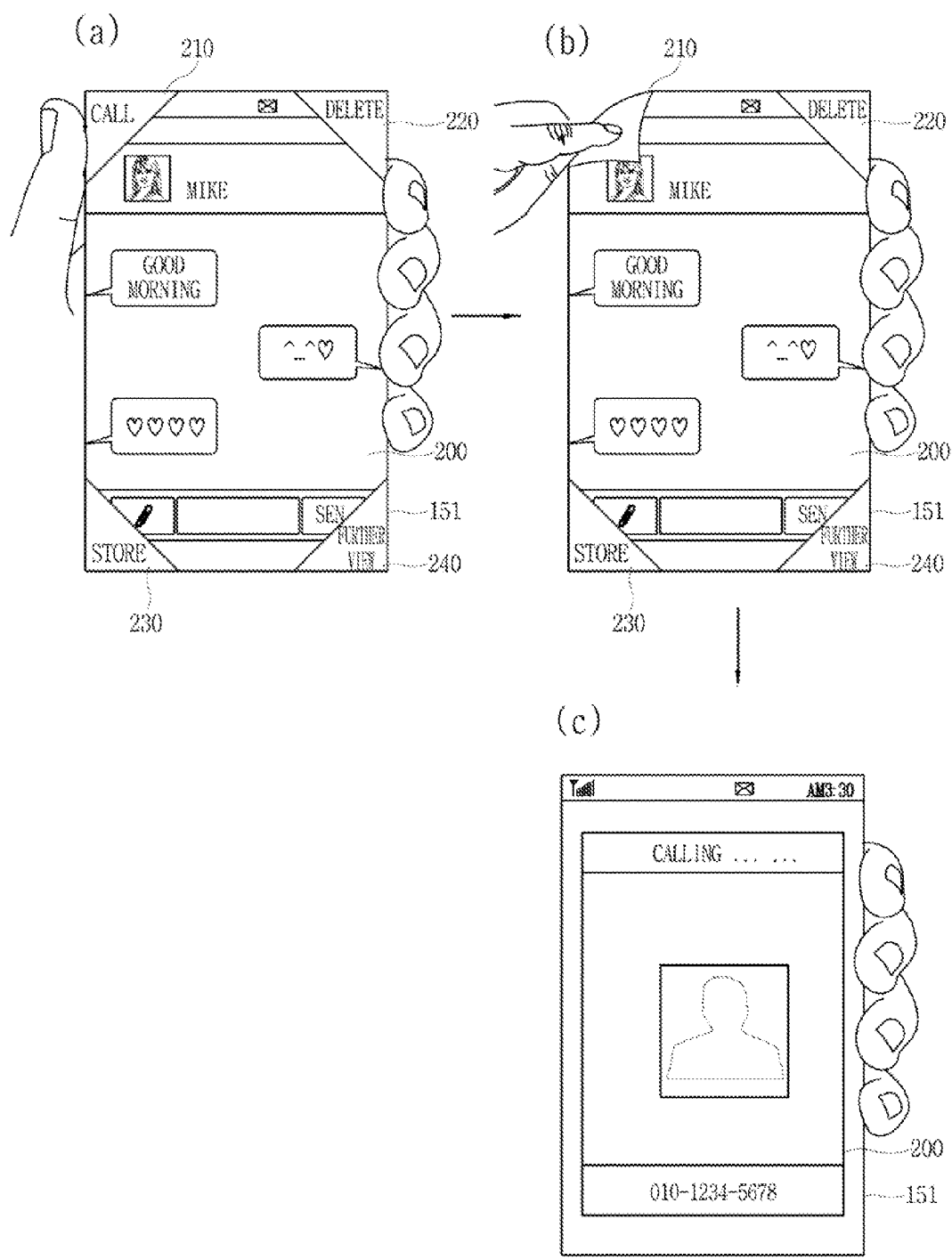

In another example, as illustrated in FIG. 6D(a), different functions may be mapped to a plurality of corner regions 210, 220, 230, and 240. After any one region of the plurality of corner regions 210, 220, 230, and 240 is bent as illustrated in FIG. 6D(b), a function mapped to the bent region may be executed in response to restoration of the bent region 210 to the original state as shown in FIG. 6D(c). Also, instead of using the restoration of the bent region 210 into the original state, the controller 180 may execute a function mapped to the bent region 210 when bending of the bent region 210 is maintained for more than a reference time.

As described above, in a mobile terminal 100 according to an example embodiment of the present invention, a user may execute a desired function by simply bending the flexible display unit 151 without directly applying a touch to the flexible display unit by using his hand, based on the bending attribute information of the flexible display unit.

Figure 7A:
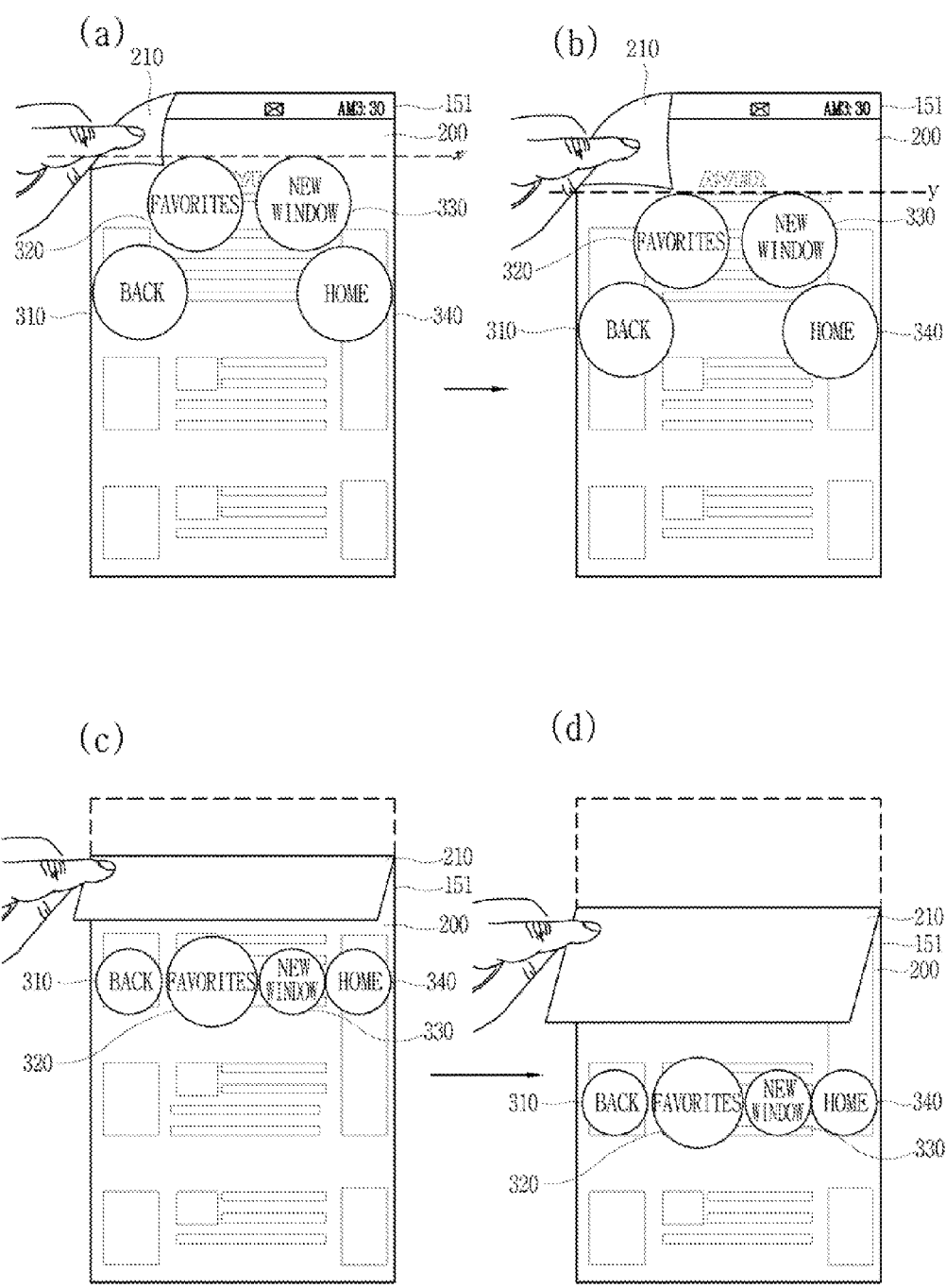
FIGS. 7A and 7B are conceptual illustrations of a method for displaying information based on bending of the flexible display unit of the mobile terminal according to an example embodiment of the present invention.
Figure 7B:
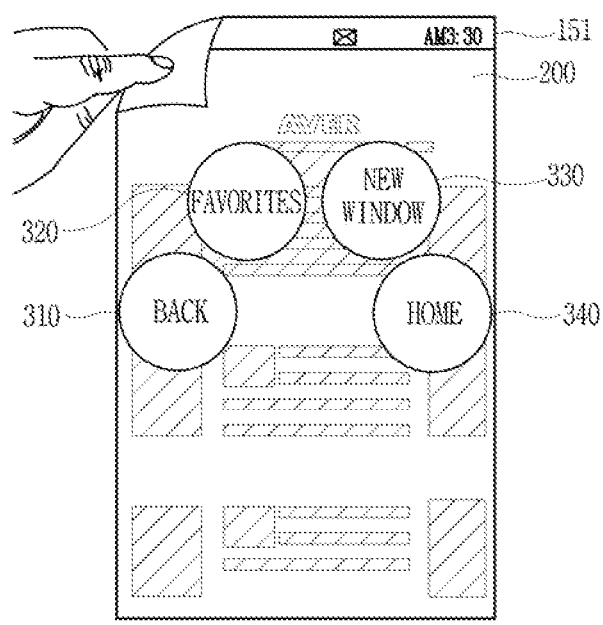

Further embodiments of the present invention include a method of displaying a function icon (or item) corresponding to a function associated with information output to the flexible display unit based on bending of the flexible display unit will be described with reference to the accompanying drawings. FIGS. 7A and 7B are conceptual illustrations of method(s) for displaying information based on bending of the flexible display unit in the mobile terminal 100 according to an example embodiment of the present invention.

In the mobile terminal 100 according to an example embodiment of the present invention, the controller 180 may output a function icon corresponding to a function associated with information output to the flexible display unit 151 or a menu list. In addition, the controller 180 may output a function icon to a region excluding a bent region of the flexible display unit and a region covered by the bent region, to allow the user to recognize the function icon all of the time.

For example, as illustrated in FIG. 7A, the controller 180 may differently control positions at which function icons are displayed, according to a length of bending of one region 210 of the flexible display unit. As shown in FIG. 7A(a), when a region 210 of the flexible display unit 151 is folded, the controller 180 outputs function icons 310, 320, 330, and 340 to the flexible display unit 151 based on a virtual reference axis 'x'. When a length of the one region 210, as illustrated in FIG. 7A(b), is longer than illustrated in FIG. 7A(a) and shorter than the length of the folded region 210, the controller 180 may output the function icons 310, 320, 330, and 340 to the flexible display unit 151 based on a virtual reference axis 'y' positioned to be lower than the reference axis 'x'.

As illustrated in FIG. 7A(c) and (d), the controller 180 may differently control positions at which the function icons 310, 320, 330, and 340 are displayed, according to the length of the folded region 210 of the flexible display unit 151. When the length of the bent portion of the flexible display unit 151 is changed, the controller 180 may change the positions at which the function icons 310, 320, 330, and 340 are displayed, in response thereto.

Also, as illustrated in FIG. 7B, when function icons 310, 320, 330, and 340 corresponding to functions associated with information 200 output to the flexible display unit 151 are displayed according to bending of the flexible display unit 151, the controller 180 may control the flexible display unit 151 to discriminate the function icons 310, 320, 330, and 340 from the information 200 output to the flexible display unit 151 (before the function icons are output). As illustrated in FIG. 7B, the controller 180 may change a method for displaying the information 200 output to the flexible display unit 151 before the function icons 310, 320, 330, and 340 are output. The controller 180 may blind the information 200 or shade the information 200, or change transparency of displaying the information 200.

In another example, the controller 180 may display the function icons 310, 320, 330, and 340 in different colors such that they can be discriminated from the information 200 or blink the function icons 310, 320, 330, and 340. In this manner, the function icons 310, 320, 330, and 340 may be highlighted.

Figure 8A:
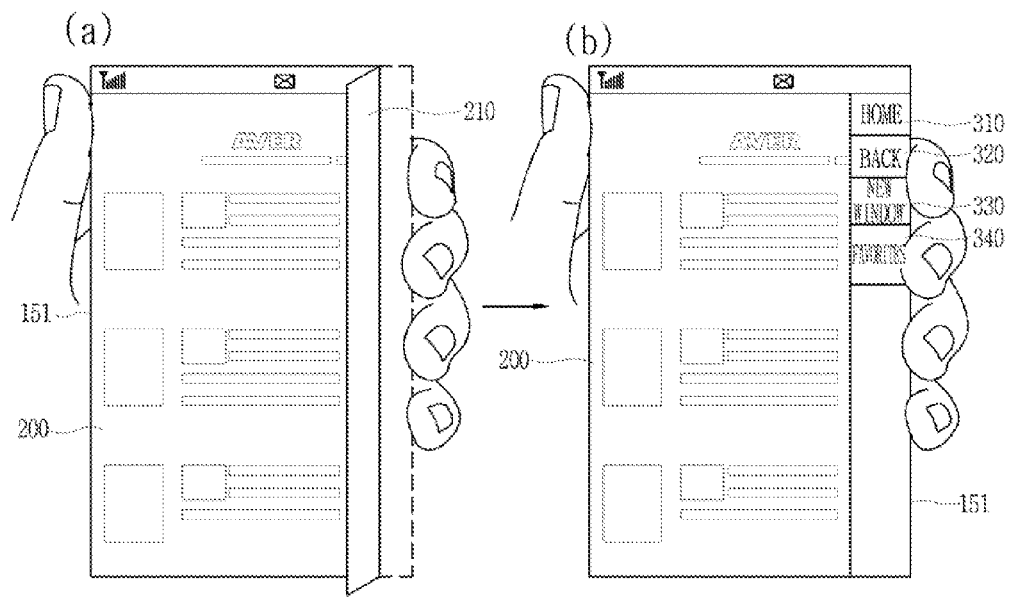
FIGS. 8A and 8B are conceptual illustrations of a method for displaying function icons based on bending of the flexible display unit of the mobile terminal according to an example embodiment of the present invention.
Figure 8B:
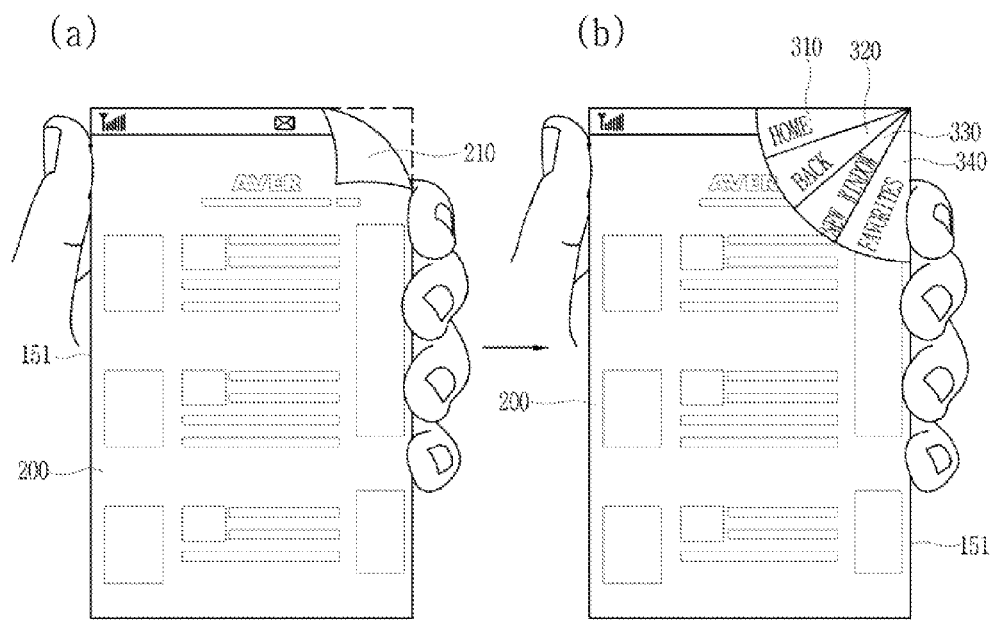

When function icons are displayed based on bending of the flexible display unit 151, the function icons may be displayed in predetermined positions. Alternatively, the controller 180 may display the function icons in a region corresponding to a region of the flexible display unit 151 as being sensed as bent. FIGS. 8A and 8B are conceptual views illustrating a method for displaying function icons based on bending of the flexible display unit 151 in the mobile terminal 100 according to an example embodiment of the present invention.

As illustrated in FIG. 8A(a), when a right edge region 210 of the flexible display unit 151 is bent by the user, the controller 180 may display function icons 310, 320, 330, and 340 in the right edge region 210 or a region corresponding to the region 210. Similarly, when the right corner region 210 of the flexible display unit 151 is bent by the user, as illustrated in FIG. 8B(a), the controller 180 may display function icons 310, 320, 330, and 340 in the right corner region 210 or a region corresponding to the region 210, as illustrated in FIG. 8B(b).

A method of controlling information output on the flexible display unit will be described in detail with reference to the accompanying drawings. FIGS. 9A, 9B, 9C, 10A, and 10B are conceptual views illustrating a method for controlling information displayed based on bending of the flexible display unit 151 in the mobile terminal 100 according to an example embodiment of the present invention. In the mobile terminal 100 according to an example embodiment of the present invention, the controller 180 may control information output to the flexible display unit 151 according to bending of the flexible display unit.

For example, in response to bending of one region 210 of the flexible display unit 151 as illustrated in FIG. 9A(a), the controller 180 may select information output to the flexible display unit 151. Also, as discussed above with reference to FIGS. 5A to 5E, information may be output to the flexible display unit 151 by using the bending of the flexible display unit 151 and may move between individually selectable section targets.

As illustrated in FIG. 9A(a), when any one folder 202 among a plurality of folders 201, 202, 203, 204, and 205 is selected in response to bending of the flexible display unit 151, the flexible display unit 151 may be controlled to display different types of information according to a strength of bending of the flexible display unit 151. For example, when the region 210 is folded with a strength having a first strength, in FIG. 9A(a), the controller 180 may control the flexible display unit 151 to display sub-items 310 and 320 included in the selected folder 202 as illustrated in FIG. 9A(b). When the region 210 is folded with a strength having a second strength greater than the first strength in FIG. 9A(a), the controller 180 may control the flexible display unit 151 to immediately display information (e.g., an image or video) included in the items, by skipping the sub-items 310 and 320 included in the selected folder 202 as illustrated in FIG. 9A(c).

Figure 9B:
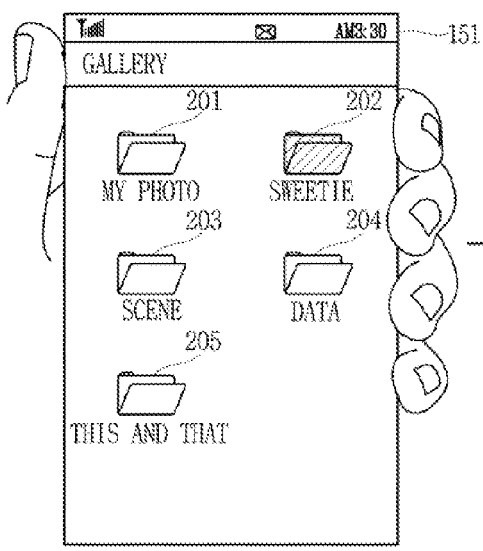
Figure 9B:
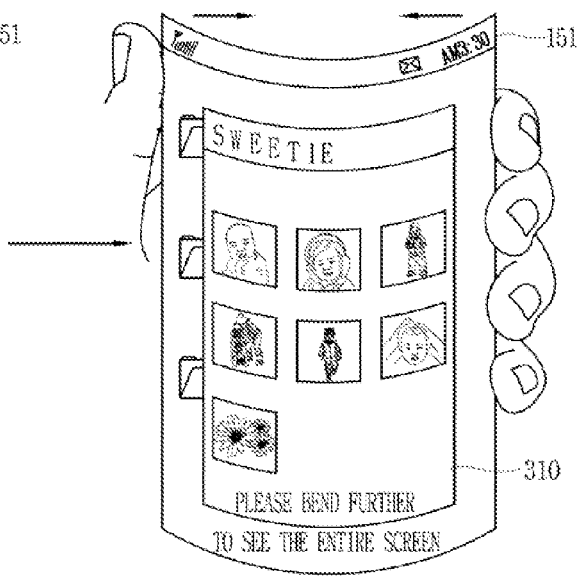
Figure 9B:
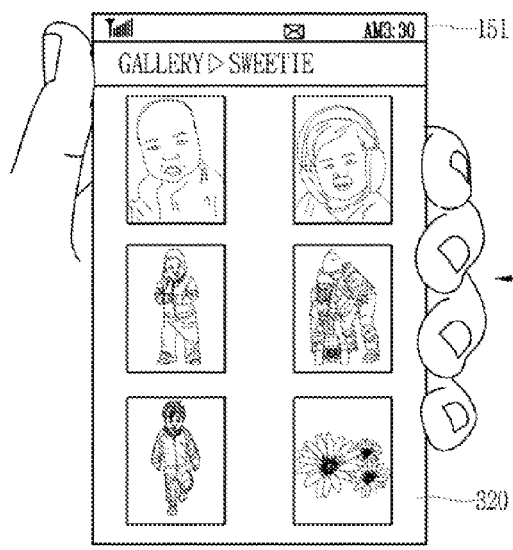
Figure 9B:
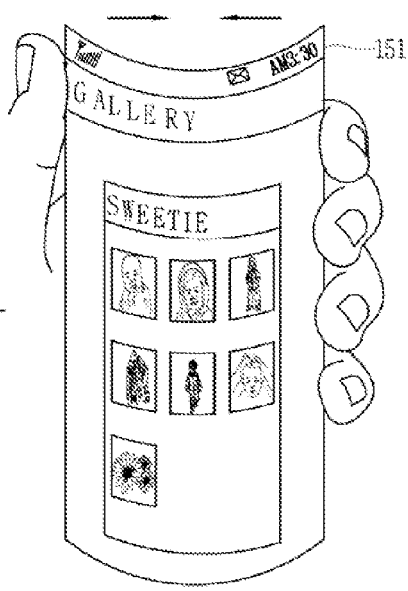

In another example, as illustrated in FIG. 9B(a), when any one folder 202 among the plurality of folders 201, 202, 203, 204, and 205 is selected in response to bending of the flexible display unit 151, the controller 180 may control the flexible display unit 151 such that a method of displaying content of the selected folder 202 is differentiated according to a strength of the bending of the flexible display unit 151. The controller displays different information on the flexible display unit 151 according to bending strength of the flexible display unit 151, so the user may use appropriate information according to a situation.

For example, as illustrated in FIG. 9B(a), when the flexible display unit 151 is bent with a first strength, the controller 180 may control the flexible display unit 151 to output a preview screen 312 including contents (e.g., an image or video) included in the selected folder 202. As illustrated in FIG. 9B(a) or (b) or FIG. 9B(c), when the flexible display unit 151 is bent with a second strength greater than the first strength, the controller 180 may control the flexible display unit 151 such that an entry screen 313 is displayed in the selected folder 202 as shown in FIG. 9B(d). When the flexible display unit 151 is bent with a first strength, the controller 180 may inform the user that information different from the currently output information is displayed in response to the second bending.

Figure 9C:
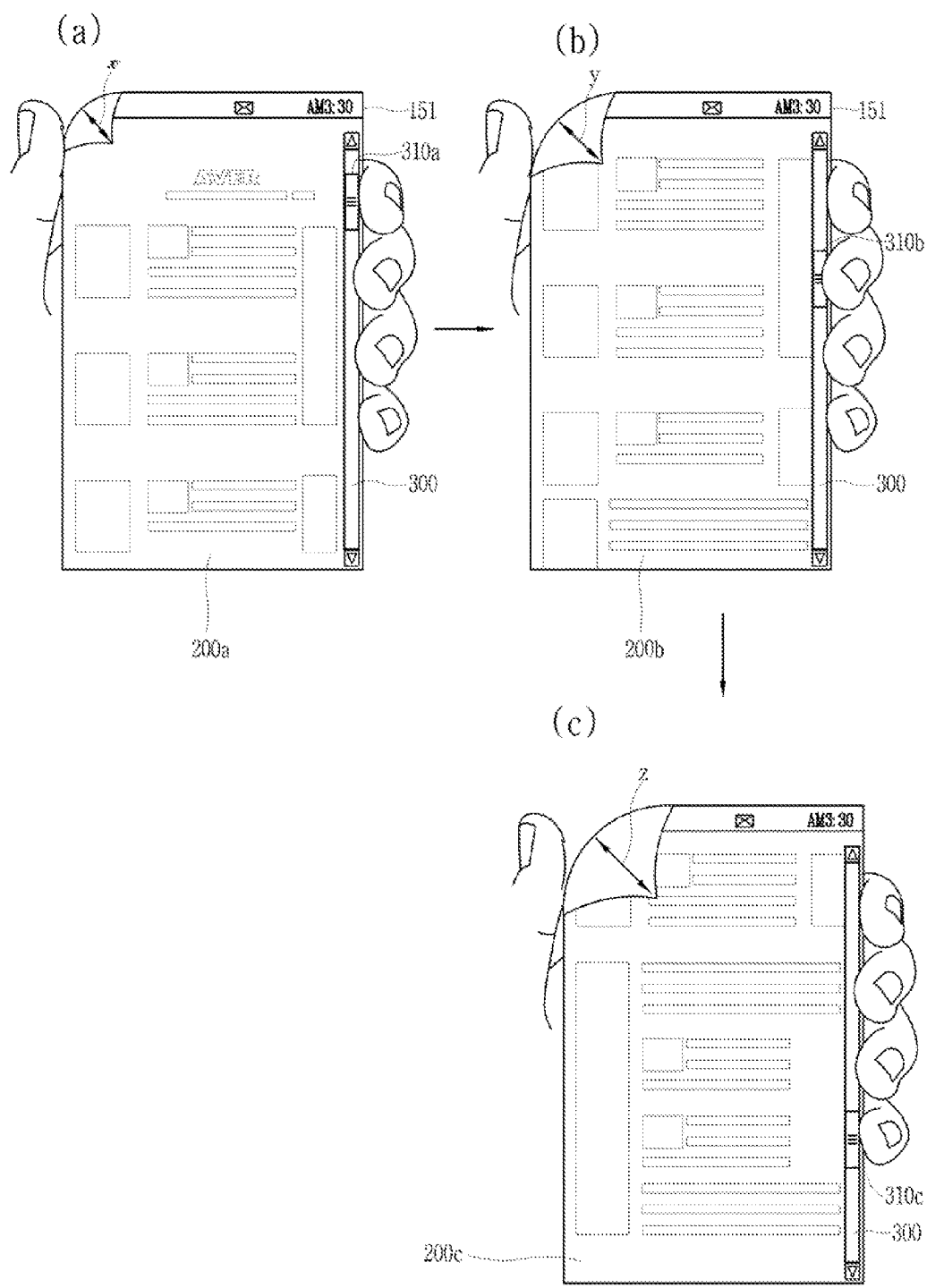

Also, as illustrated in FIG. 9C, the controller 180 may move or scroll information displayed on the flexible display unit 151 in response to bending of the flexible display unit 151. The controller 180 may scroll information displayed on the flexible display unit 151 according to a length of a certain bent region or a pre-set bent region of the flexible display unit 151, or control scrolled amount of the information.

For example, as illustrated in FIG. 9C(a), (b), and (c), the controller 180 scrolls the information displayed on the flexible display unit 151 based on successive folding of one corner region of the flexible display unit 151. For example, based on the fact that lengths of the bent corner region are gradually changed (e.g., from length x, to length y, to length z . . . to length n), the controller 180 may move information output to the flexible display unit (200a, to 200b, to 200c). Also, the controller 180 may control a scroll amount of information according to a strength with which the corner region is folded or a speed at which folded length is changed.

Additional embodiments of the present invention may enable the controller 180 to control the flexible display unit 151 to continuously scroll the information output to the flexible display unit 151 until before the bent corner region is restored.

Other embodiments of the present invention may enable the controller 180 to provide a method of applying a scroll control command by using at least an image, a pop-up window, text, or a voice to allow the user to recognize that a scroll control command is being provided, in response to the bending of the flexible display unit 151.

As described above, in the mobile terminal 100 according to an example embodiment of the present invention, information output to a flexible display unit 151 can be variably controlled by using the characteristics of the flexible display unit without using a touch input.

Figure 10A:
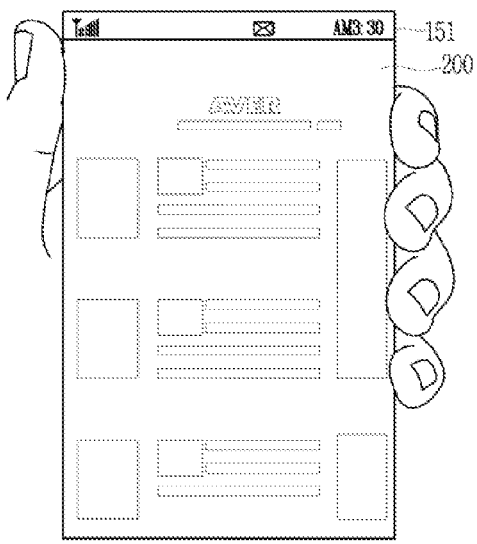
Figure 10A:
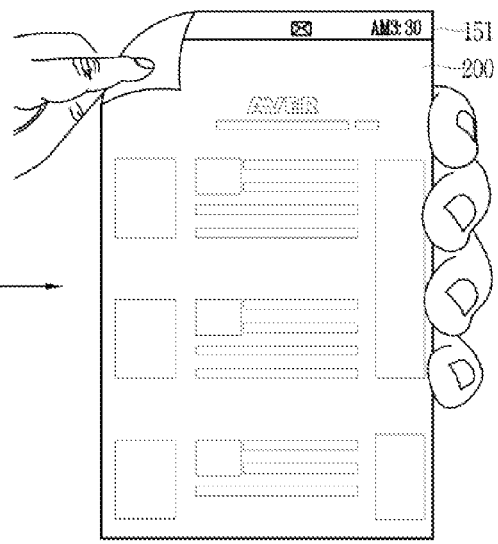
Figure 10A:
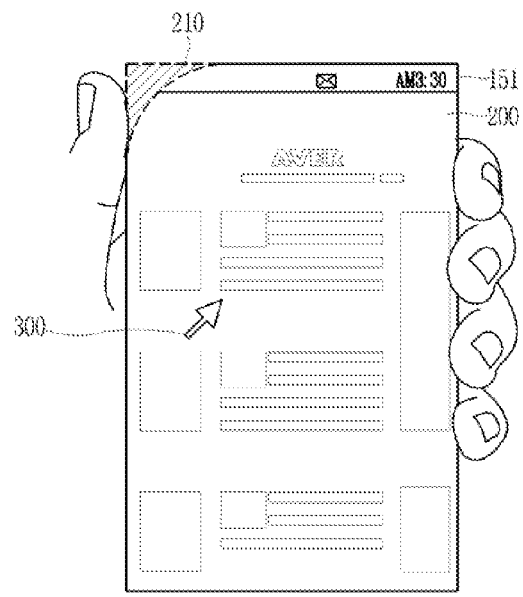

Also, as illustrated in FIG. 10A(a) and (b), in response to bending of a first corner among a plurality of corners of the flexible display unit, the controller 180 may activate the first region 210 such that a control signal for controlling the output information can be received through the first region corresponding to the first corner. Namely, the controller 180 may use the first region 210 as a pad region to which a control signal is input, and control information output to the flexible display unit 151 according to a touch input by a touch object (e.g., user's finger or a touch pen) with respect to the first region based on the activation. Namely, the controller 180 may output a touch pointer 300 for controlling the information output to the flexible display unit 151 according to a touch input by the touch object (e.g., a user's finger or a touch pen) with respect to the first region.

Figure 10B:
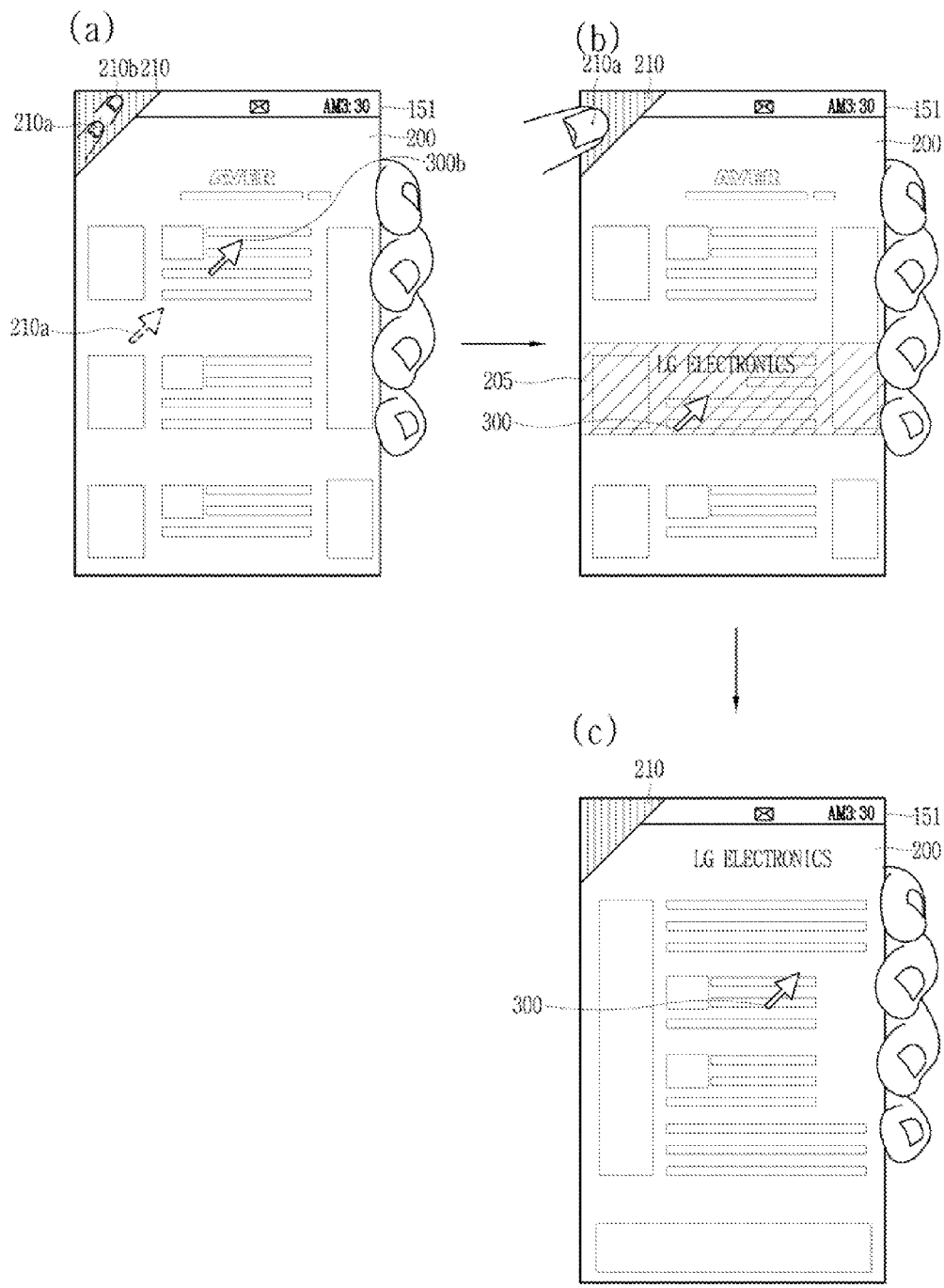

Also, as illustrated in FIG. 10B(a), as the touch object moves (210a to 210b) on the pad region 210, the controller 180 may move the touch pointer 300. As shown in FIG. 10B(b), the controller 180 may control the flexible display unit 151 to select an item displayed in a position where the touch pointer 300 is placed based on an application of a tap touch, a long touch, or a double touch by the touch object on the pad region 210. When the item displayed in the position where the touch pointer 300 is placed is selected, as illustrated in FIG. 10B(b), information corresponding to the selected item may be output to the flexible display unit 151 as illustrated in FIG. 10B(c), As described above, in the mobile terminal 100 according to an example embodiment of the present invention, since the pad region 210 for controlling information output to the flexible display unit is activated based on bending of one region of the flexible display unit 151, information output to the flexible display unit can be controlled even though a touch input is not applied to the entire flexible display unit. Thus, the user can input a control command to the mobile terminal without inconvenience even when the size of the flexible display unit is large.

Also, in the mobile terminal 100 according to an example embodiment of the present invention, a function associated with information output to a flexible display unit can be performed by using bending characteristics of the flexible display unit 151. Thus, in some examples, although the user does not apply a touch input to the flexible display unit to change a page or enter a sub-menu, the user can easily perform various functions by using bending of the flexible display unit.

In the example embodiments of the present invention, the foregoing methods can be implemented as codes that can be read by a processor in a program-recorded medium. The processor-readable medium may include a ROM, a RAM, a CD-ROM, a magnetic tape, a floppy disk, an optical data storage device, or a non-transitory computer readable medium. The processor-readable medium also includes implementations in the form of carrier waves or signals (e.g., transmission via the Internet).

The mobile terminal according to the example embodiments of the present disclosure is not limited in its application of the configurations and methods. The entirety or a portion of the example embodiments may be selectively combined to be configured into various modifications.

As the exemplary example embodiments may be implemented in several forms without departing from the characteristics thereof, it should also be understood that the above-described example embodiments are not limited by any of the details of the foregoing description, unless otherwise specified, but rather should be construed broadly within its scope as defined in the appended claims. Therefore, changes and modifications that fall within the scope of the claims, or equivalents of such scope are therefore intended to be embraced by the specification and claims.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A mobile terminal comprising:
a flexible display configured to be bent in response to force applied to the flexible display;
a sensor configured to sense a bending of at least one region of the flexible display, wherein the bending divides the flexible display into a bent region, a closed region covered from view by the bent region, and an open region not covered from view by the bent region; and a controller configured to:
control the flexible display to display one or more icons in response to the bending wherein the one or more icons are varied based on information displayed on the flexible display; and
execute a function corresponding to a first icon of the displayed one or more icons in response to an additional bending of the flexible display at a particular location;
wherein the first icon is selected among the displayed one or more icons according to a bending attribute of the additional bending at the particular location, and
wherein the controller is further configured to change a display position of the one or more icons to a different position within the open region according to the bending, wherein the bending attribute of the additional bending comprises information regarding at least a number of times of the additional bending, a strength of the additional bending, or a direction of the additional bending,
wherein the controller is configured to control the flexible display to distinctively display the first icon; and control the flexible display to distinctively display a second icon of the displayed one or more icons in response to a change in the bending attribute of the additional bending, and wherein the controller is further configured to execute different functions corresponding to each of the first icon and the second icon according to a strength of the additional bending of the flexible display.

2. The mobile terminal of claim 1, wherein the displayed one or more icons each correspond to a function of a plurality of functions.

3. The mobile terminal of claim 2, wherein the controller is further configured to terminate an output to the flexible display in response to a restoration of the bent flexible display when the first icon is selected.

4. The mobile terminal of claim 1, wherein the controller is further configured to: control the display to distinctly display an icon at the particular location; and execute a function corresponding to the distinctly displayed icon.

5. The mobile terminal of claim 2, wherein the controller is further configured to control the flexible display to: distinctly display a screen image when the screen image is displayed prior to the one or more icons being displayed by altering display attribute information of the screen image or displaying the one or more icons in a highlighted manner.

6. The mobile terminal of claim 1, wherein:
the bending of at least one region of the flexible display is to a first corner of the flexible display; the particular location is at a second corner of the flexible display different from the first corner; and the controller is further configured to execute the function corresponding to the first icon in response to simultaneous bending of the first and second corners.

7. The mobile terminal of claim 6, wherein the controller is further configured to control the flexible display to output guide information to the first corner in response to the bending.

8. The mobile terminal of claim 1, wherein the controller is further configured to: activate a first region of the flexible display in response to bending of a first corner of the flexible display in order to receive a control signal for controlling the output information via the first region; and control the flexible display to output information according to a touch input received via a touch object with respect to the first region.

9. A mobile terminal comprising:
a flexible display configured to be bent in response to an applied force;
a sensor configured to sense bending of the flexible display, wherein the bending divides the flexible display into a bent region, a closed region covered from view by the bent region, and an open region not covered from view by the bent region; and a controller configured to:
control the flexible display to display at least one icon corresponding to at least one function associated with information output to the flexible display unit in response to a first bending of the flexible display;
select a first icon of the at least one icon in response to a second bending of the flexible display at a particular location, wherein the first icon is selected among the displayed at least one icon according to a bending attribute of the second bending at the particular location; and control the flexible display to discriminately display the first icon in a highlighted manner;
wherein the first bending and second bending are different, and
wherein the controller is further configured to change a display position of the one or more icons to a different position within the open region according to the bending,
wherein the second bending comprises a plurality of bends of the flexible display at the particular location; the bending attribute of the second bending corresponds to a number of the plurality of bends; and the controller is further configured to cycle through each of the displayed at least one icon in response to each of the plurality of bends to select the first icon, and
wherein the second bending comprises an unbending of the flexible display and the first icon corresponds to an icon of the displayed at least one icon selected when the flexible display is unbent.

10. The mobile terminal of claim 9, wherein the controller is further configured to control the flexible display to discriminately display a second icon of the at least one icon and cease discriminately displaying the first icon when the second bending is continuously sensed, wherein the second icon is different from the first icon.

11. The mobile terminal of claim 10, wherein the controller is further configured to control the flexible display to terminate display of the at least one icon when the second bending is no longer sensed or when a pre-set time has lapsed.

12. The mobile terminal of claim 9, wherein:
the bending attribute of the second bending comprises information regarding at least a number of times of the second bending, a strength of the second bending, or a direction of the second bending.

13. The mobile terminal of claim 9, wherein the controller is further configured to map the at least one icon based on a folded length of the first bending of the flexible display.

14. The mobile terminal of claim 13, wherein the controller is further configured to enable the folded length of the first bending to be adjusted via text or images.

15. The mobile terminal of claim 9, wherein the controller is further configured to execute a function corresponding to the first icon in response to restoration of the flexible display to a neutral state.

16. The mobile terminal of claim 9, wherein the controller is further configured to control the flexible display to output guide information regarding a region by using at least visual information or voice information.

17. A method of controlling information output on a flexible display of a mobile terminal, the method comprising:
displaying information on the flexible display;
displaying at least one icon corresponding to at least one function associated with the displayed information when a first bending of the flexible display is sensed,
wherein the bending divides the flexible display into a bent region, a closed region covered from view by the bent region, and an open region not covered from view by the bent region, and
wherein a display position of the at least one icon is changed to a different position within the open region according to the first bending; and
executing a function corresponding to one of the displayed at least one icon when a second bending of the flexible display is sensed at a particular location;
wherein the one icon is selected among the at least one icon according to a bending attribute of the second bending at the particular location,
wherein the second bending comprises a plurality of bends of the flexible display at the particular location; the bending attribute of the second bending corresponds to a number of the plurality of bends; and the controller is further configured to cycle through each of the displayed the at least one icon in response to each of the plurality of bends to select the at least one icon, and wherein the second bending comprises an unbending of the flexible display and the at least one icon corresponds to an icon of the displayed at least one icon selected when the flexible display is unbent.

* * * * *